US012348992B2

(12) United States Patent
Khoshnevisan et al.

(10) Patent No.: US 12,348,992 B2
(45) Date of Patent: Jul. 1, 2025

(54) SEARCH SPACE SET LINKING WITH UNIFIED BEAM CONFIGURATIONS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/665,476

(22) Filed: Feb. 4, 2022

(65) Prior Publication Data
US 2023/0254716 A1 Aug. 10, 2023

(51) Int. Cl.
| | | |
|---|---|---|
| H04W 72/04 | (2023.01) |
| H04W 16/28 | (2009.01) |
| H04W 24/08 | (2009.01) |
| H04W 72/044 | (2023.01) |
| H04W 72/0446 | (2023.01) |
| H04W 72/23 | (2023.01) |

(52) U.S. Cl.
CPC ........... *H04W 24/08* (2013.01); *H04W 16/28* (2013.01); *H04W 72/0446* (2013.01); *H04W 72/046* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 12,108,426 B2* | 10/2024 | Kim | H04W 72/046 |
| 2020/0267750 A1* | 8/2020 | Park | H04W 72/0446 |

(Continued)

FOREIGN PATENT DOCUMENTS

| | | |
|---|---|---|
| WO | WO-2021157938 A1 | 8/2021 |
| WO | WO-2022145882 A1 | 7/2022 |
| WO | WO-2022154607 A1 | 7/2022 |

OTHER PUBLICATIONS

Moderator (Qualcomm): "Summary #1 of Email Discussions [106-e-NR-feMIM0-03] for mTRP PDCCH Enhancements", 3GPP TSG-RAN WG1 Meeting #106-e, R1-2108254, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 16, 2021, XP052042084, 74 Pages, The Whole Document, p. 25-p. 61.

(Continued)

*Primary Examiner* — Duc T Duong
(74) *Attorney, Agent, or Firm* — Holland & Hart LLP

(57) ABSTRACT

Methods, systems, and devices for wireless communications are described. Generally, a user equipment (UE) may receive first control signaling indicating that a first search space set (e.g., including one or more physical downlink control channel (PDCCH) candidates) and a second search space set (e.g., including one or more PDCCH candidates) are linked. The UE may also receive second control signaling indicating a number of transmission configuration indicator (TCI) states. The UE may receive a downlink control information (DCI) message in one PDCCH candidate, or may receive the DCI message in multiple linked PDCCH candidates, based on how many TCI states are indicated in the second control information.

30 Claims, 19 Drawing Sheets

(56) References Cited

U.S. PATENT DOCUMENTS

| | | |
|---|---|---|
| 2020/0288479 A1 | 9/2020 | Xi et al. |
| 2021/0195601 A1 | 6/2021 | Khoshnevisan et al. |
| 2022/0007371 A1* | 1/2022 | Kyung .............. H04W 72/0446 |
| 2022/0217694 A1 | 7/2022 | Kim et al. |
| 2022/0361018 A1 | 11/2022 | Saber et al. |
| 2022/0408468 A1* | 12/2022 | Jang ...................... H04L 5/0094 |
| 2023/0050480 A1* | 2/2023 | Zhu ........................ H04B 7/024 |
| 2023/0112271 A1* | 4/2023 | Kim ...................... H04L 5/0053 370/329 |
| 2023/0125672 A1* | 4/2023 | Grossmann ........... H04L 1/0038 |
| 2023/0180033 A1* | 6/2023 | Cirik ...................... H04B 7/088 |
| 2023/0180249 A1* | 6/2023 | Bala .................... H04W 52/028 370/329 |
| 2023/0209538 A1 | 6/2023 | Cirik et al. |
| 2023/0224916 A1* | 7/2023 | Cirik ...................... H04W 74/08 370/329 |
| 2023/0284197 A1 | 9/2023 | Zhang et al. |
| 2023/0308249 A1* | 9/2023 | Matsumura ........... H04L 5/0053 |
| 2023/0309085 A1 | 9/2023 | Khoshnevisan et al. |
| 2023/0318761 A1* | 10/2023 | Jang .................... H04W 72/232 370/329 |
| 2023/0354070 A1* | 11/2023 | Cirik .................. H04L 27/2602 |
| 2023/0363005 A1* | 11/2023 | Cirik ...................... H04W 72/23 |
| 2024/0023101 A1* | 1/2024 | Gao ...................... H04L 5/0023 |
| 2024/0056987 A1* | 2/2024 | Cirik ................. H04W 72/1268 |
| 2024/0063880 A1* | 2/2024 | Ling ........................ H04L 1/08 |
| 2024/0089061 A1* | 3/2024 | Gao ...................... H04L 5/0098 |
| 2024/0098531 A1* | 3/2024 | Gao ..................... H04B 7/0695 |
| 2024/0129772 A1 | 4/2024 | Laddu et al. |
| 2024/0147496 A1* | 5/2024 | Ganesan ............. H04W 72/232 |
| 2024/0154664 A1 | 5/2024 | Bhamri et al. |
| 2024/0187199 A1* | 6/2024 | Gao ...................... H04L 5/0094 |
| 2024/0235783 A1* | 7/2024 | Matsumura ........... H04L 5/0094 |
| 2024/0283616 A1* | 8/2024 | Gao ...................... H04W 72/21 |
| 2024/0430904 A1* | 12/2024 | Zhang .................... H04L 1/1664 |
| 2025/0008517 A1* | 1/2025 | Li ........................ H04B 7/0695 |

OTHER PUBLICATIONS

International Search Report and Written Opinion—PCT/US2023/010460—ISA/EPO—Apr. 24, 2023.

NTT Docomo, et al., "Enhancements on Multi-TRP/Panel Transmission", 3GPP TSG RAN WG1 #99, R1-1912893, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 21 Pages, Nov. 8, 2019 (Nov. 8, 2019), XP051820229, the whole document.

VIVO: "Remaining Issues on Multi-TRP for PDCCH, PUCCH and PUSCH Enhancements", 3GPP TSG RAN WG1 #107-e, R1-2110991, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, 21 Pages, Nov. 5, 2021 (Nov. 5, 2021), XP052073947, sections 2.4.1-2.4.4.

* cited by examiner

First Search Space Set 205-a

Second Search Space Set 205-b

PDCCH Candidate 230

First Search Space Set 340-a

Second Search Space Set 340-b

PDCCH Candidate 335

First Search Space Set 635

Second Search Space set 640

SEARCH SPACE SET LINKING WITH UNIFIED BEAM CONFIGURATIONS

INTRODUCTION

The following relates to wireless communications, including downlink signaling based on different beam configurations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method is described. The method may include receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The method may further include receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The method may include receiving, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

An apparatus for wireless communication at a first network node is described. The apparatus may include a processor and memory coupled with the processor. The processor may be configured to receive, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The processor may be configured to receive, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The processor may be configured to receive, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

Another apparatus for wireless communication at a first network node is described. The apparatus may include means for receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The apparatus may include means for receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The apparatus may include means for receiving, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

A non-transitory computer-readable medium storing code for wireless communication at a first network node is described. The code may include instructions executable by a processor to receive, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The code may include instructions executable by a processor to receive, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The code may include instructions executable by a processor to receive, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

Some examples of the method, apparatuses, and non-transitory computer-readable medium described herein may further include operations, features, means, or instructions for refraining from linking the first group of downlink control channel candidates and the second group of downlink control channel candidates based on the second control information that includes the information indicative of one TCI state.

Some examples of the method, apparatuses, and non-transitory computer-readable medium described herein may further include operations, features, means, or instructions for counting a first downlink control channel candidate of the first group of downlink control channel candidates toward a blind decoding limit associated with a first slot and counting a second downlink control channel candidate of the second group of downlink control channel candidates toward the blind decoding limit associated with the first slot based on the second control information that includes the information indicative of one TCI state, the first downlink control channel candidate and the second downlink control channel candidate being located in the first slot.

In some examples of the method, apparatuses, and non-transitory computer-readable medium described herein, receiving the first downlink control information message may include operations, features, means, or instructions for receiving, using the one TCI state, the first downlink control information message in one of the first group of downlink control channel candidates or the second group of downlink control channel candidates.

Some examples of the method, apparatuses, and non-transitory computer-readable medium described herein may further include operations, features, means, or instructions for receiving, from the second network node, a radio resource control message enabling the first network node to refrain from linking the first group of downlink control channel candidates and the second group of downlink control channel candidates based on the second control information that includes the information indicative of one TCI state, the refraining based on receiving the radio resource control message.

Some examples of the method, apparatuses, and non-transitory computer-readable medium described herein may further include operations, features, means, or instructions for receiving, using the one TCI state, a second downlink control information message in the second group of downlink control channel candidates in the second monitoring occasion associated with the second search space set and decoding the first downlink control information message independently from the second downlink control information message.

In some examples of the method, apparatuses, and non-transitory computer-readable medium described herein, the one TCI state may be associated with a first coreset associated with the first search space set and a second coreset associated with the second search space set.

Some examples of the method, apparatuses, and non-transitory computer-readable medium described herein may further include operations, features, means, or instructions for linking the first group of downlink control channel candidates and the second group of downlink control channel candidates based on the second control information that includes the information indicative of two TCI states.

Some examples of the method, apparatuses, and non-transitory computer-readable medium described herein may further include operations, features, means, or instructions for counting a first downlink control channel candidate of the first group of downlink control channel candidates toward a blind decoding limit associated with a first slot, counting a second downlink control channel candidate of the second group of downlink control channel candidates toward the blind decoding limit associated with the first slot, and counting a combination of the first downlink control channel candidate and the second downlink control channel candidate toward the blind decoding limit associated with the first slot based on the second control information that includes the information indicative of two TCI states, first downlink control channel candidate and the second downlink control channel candidate being located in the first slot.

Some examples of the method, apparatuses, and non-transitory computer-readable medium described herein may further include operations, features, means, or instructions for decoding, based on the first control information and the second control information that includes the information indicative of two TCI states, the first downlink control information message based on a reference downlink control channel candidate of the first group of downlink control channel candidates.

In some examples of the method, apparatuses, and non-transitory computer-readable medium described herein, a first TCI state of the two TCI states may be associated with a first coreset associated with the first search space set and a second TCI state of the two TCI states may be associated with a second coreset associated with the second search space set.

Some examples of the method, apparatuses, and non-transitory computer-readable medium described herein may further include operations, features, means, or instructions for receiving, from the second network node, third control information that includes information indicative of a configuration of a first group of control resource sets including a first control resource set associated with the first search space set and a second group of control resource sets including a second control resource set associated with the second search space set and determining whether the first network node may be to link the first group of downlink control channel candidates and the second group of downlink control channel candidates based on the third control information, where receiving the second control information may be based on the determination.

Some examples of the method, apparatuses, and non-transitory computer-readable medium described herein may further include operations, features, means, or instructions for determining whether the first network node may be to link the first group of downlink control channel candidates and the second group of downlink control channel candidates based on whether a first control resource set associated with the first search space set may be the same as a second control resource set associated with the second search space set.

Some examples of the method, apparatuses, and non-transitory computer-readable medium described herein may further include operations, features, means, or instructions for receiving, from the second network node, third control information that includes information indicative of a configuration of one or more groups of control resource sets, receiving, from the second network node, fourth control information that includes information indicative of a configuration of a first control resource set associated with the first search space set, a second control resource set associated with the second search space set, or both, where the first control resource set, the second control resource set, or both, may be distinct from the one or more groups of control resource sets, and determining whether the first network node may be to link the first group of downlink control channel candidates and the second group of downlink control channel candidates based on the fourth control information.

A method for wireless communication at a first network node is described. The method may include outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The method may include outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The method may include outputting, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

An apparatus for wireless communication at a first network node is described. The apparatus may include a processor and memory coupled with the processor. The processor may be configured to cause the apparatus to output, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The processor may be configured to output, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The processor may be configured to output, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

Another apparatus for wireless communication at a first network node is described. The apparatus may include means for outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The apparatus may include means for outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The apparatus may include means for outputting, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

A non-transitory computer-readable medium storing code for wireless communication at a first device is described. The code may include instructions executable by a processor to output, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The code may include instructions executable by a processor to output, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The code may include instructions executable by a processor to output, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states.

Some examples of the method, apparatuses, and non-transitory computer-readable medium described herein may further include operations, features, means, or instructions for determining, based on outputting the second control information that includes information indicative of one TCI state, that the first group of downlink control channel candidates may be independent from the second group of downlink control channel candidates.

Some examples of the method, apparatuses, and non-transitory computer-readable medium described herein may further include operations, features, means, or instructions for outputting, to the second network node, a radio resource control message enabling the second network node to refrain from linking the first group of downlink control channel candidates and the second group of downlink control channel candidates based on the second control information that includes the information indicative of one TCI state, the determination based on outputting the radio resource control message.

Some examples of the method, apparatuses, and non-transitory computer-readable medium described herein may further include operations, features, means, or instructions for outputting, according to the one TCI state, a second downlink control information message in the second group of downlink control channel candidates in the second monitoring occasion associated with the second search space set, the first downlink control information message independent from the second downlink control information message.

Some examples of the method, apparatuses, and non-transitory computer-readable medium described herein may further include operations, features, means, or instructions for determining, based on outputting the second control information that includes the information indicative of two TCI states, that the first group of downlink control channel candidates may be linked with the second group of downlink control channel candidates according to the first control information.

In some examples of the method, apparatuses, and non-transitory computer-readable medium described herein, outputting the first downlink control information message may include operations, features, means, or instructions for outputting a first repetition of the first downlink control information message according to a first TCI state of the two TCI states via a first coreset associated with the first search space set and outputting a second repetition of the first downlink control information message according to a second TCI state of the two TCI states via a second coreset associated with the second search space set, the outputting the first repetition, the second repetition, or a combination thereof, based at last in part on a reference downlink control channel candidate of the first group of downlink control channel candidates.

Some examples of the method, apparatuses, and non-transitory computer-readable medium described herein may further include operations, features, means, or instructions for outputting, to the second network node, third control information that includes information indicative of a configuration of a first group of control resource sets including a first control resource set associated with the first search space set and a second group of control resource sets including a second control resource set associated with the second search space set and determining whether the second network node may be to link the first group of downlink control channel candidates and the second group of downlink control channel candidates based on the third control information, where outputting the first downlink control information message may be based on the determination.

Some examples of the method, apparatuses, and non-transitory computer-readable medium described herein may further include operations, features, means, or instructions for determining whether the second network node may be to link the first group of downlink control channel candidates and the second group of downlink control channel candidates based on whether a first control resource set associated with the first search space set may be the same as a second control resource set associated with the second search space set.

Some examples of the method, apparatuses, and non-transitory computer-readable medium described herein may further include operations, features, means, or instructions for outputting, to the second network node, third control information that includes information indicative of a configuration of one or more groups of control resource sets, outputting, to the second network node, fourth control information that includes information indicative of a configuration of a first control resource set associated with the first search space set, a second control resource set associated with the second search space set, or both, where the first control resource set, the second control resource set, or both, may be distinct from the one or more groups of control resource sets, and determining whether the second network node may be to link the first group of downlink control channel candidates and the second group of downlink control channel candidates based on the fourth control information.

DETAILED DESCRIPTION

Figure 1:
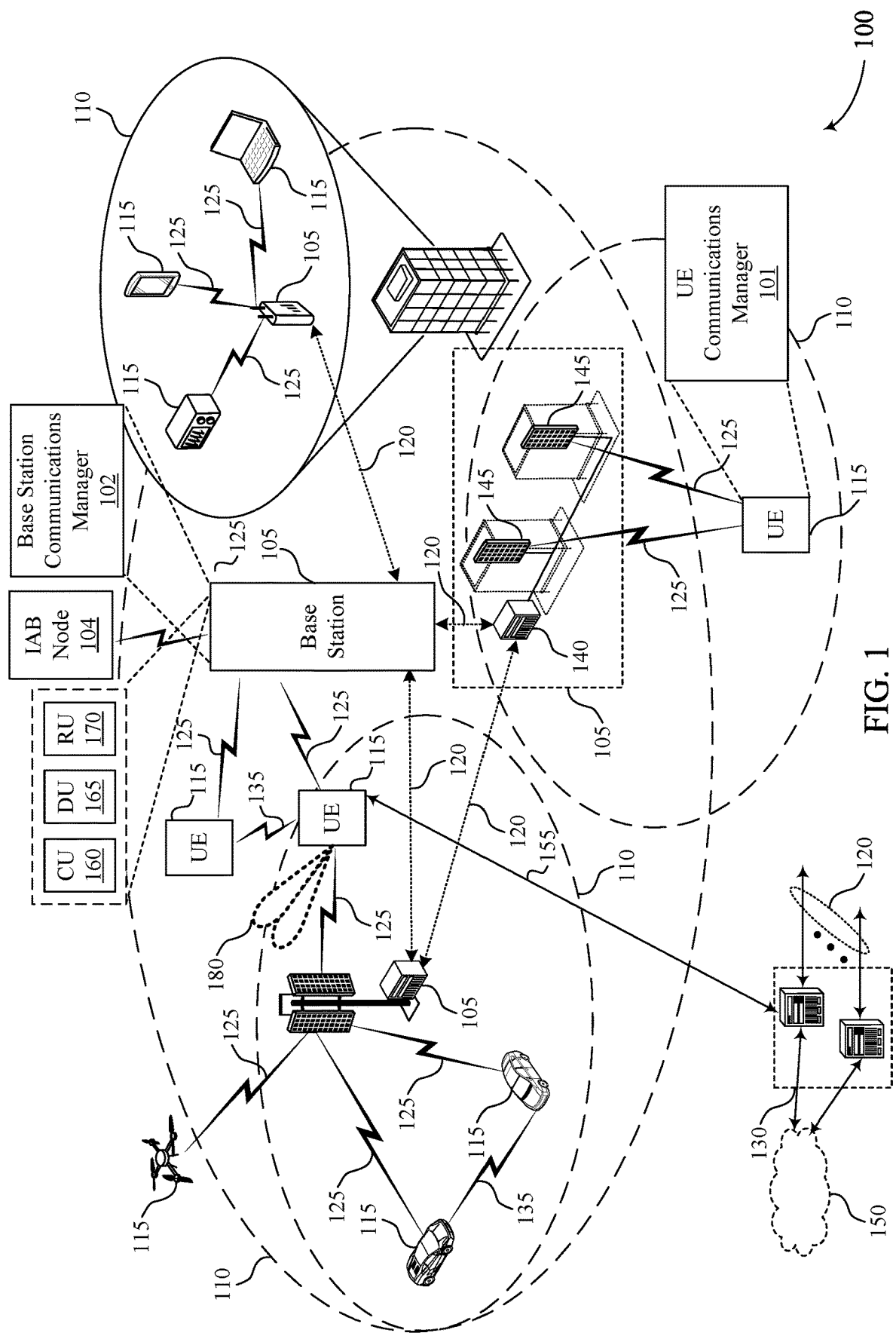
FIG. 1 illustrates an example of a wireless communications system that supports search space set linking with unified beam configurations in accordance with one or more aspects of the present disclosure.

Wireless communications may support linking of search space sets. For example, a network node (e.g., a user equipment (UE)) may be configured to link physical downlink control channel (PDCCH) candidates of two or more search space sets. Search space sets may refer to sets of time and frequency resources spanning multiple time slots, channels, or both, designated for monitoring for downlink control signaling. Each search space set may include multiple monitoring occasions (MOs), and each MO may be a subset of time and frequency resources included in the search space set. A search space set may be configured to include periodic MOs (e.g., one periodic MO per a number of slots, one MO per slot, two MOs per slot, or the like). The time and frequency resources of a search space set may be subdivided into PDCCH candidates, each PDCCH candidate including one or more time or frequency resources on which the UE may monitor for and attempt to decode downlink control signaling. Thus, each MO of a search space set may include one or more PDCCH candidates in which a downlink control information (DCI) message may be received. A UE may perform a blind decode in some or all of the PDCCH candidates in a MO (e.g., may attempt to decode a DCI message during a PDCCH candidate, and if a cyclic redundancy check (CRC) passes, the UE has successfully received a DCI message).

Linking of PDCCH candidates may support PDCCH repetition, in which case a network entity (e.g., a base station, a remote radio head (RRH), a network-controlled entity, a network node, or the like)) may transmit multiple repetitions of a same downlink message (e.g., a DCI message) during multiple linked PDCCH candidates. The receiving UE may receive at least portions of the repetitions of the DCI message during respective linked PDCCH candidates, and may combine received repetitions, resulting in improved likelihood of successful reception of the entire DCI message.

The UE may also be configured with one or two TCI states to apply to all control resource sets (CORESETs) subsequent to a determined time. A CORESET may refer to a subset of resources (e.g., one, two, or three symbols within a slot) for receiving control signaling. A TCI state may refer to a configuration of one or more parameters for generating a directional beam (e.g., for transmitting uplink signaling, receiving downlink signaling, or both).

In some examples, PDCCH repetition may support beam diversity, which may enable the UE to receive repetitions of a DCI message via multiple beams (e.g., increasing the likelihood of successful receipt of the DCI message, even if one directional beam experiences lower quality or higher interference than another beam). If the base station configures the UE with two TCI states, then the UE may use the two TCI states for receiving repetitions of the same DCI message across the linked search space sets via the two different CORESETs (e.g., beam diversity). The UE may expend computational resources to receive and decode the repetitions of the same DCI message across the linked search space sets using two TCI states, and may take more time to successfully decode the repetitions of the DCI message. The UE may also increase the likelihood of successful reception of the DCI message (e.g., based on the beam diversity). However, if the base station configures the UE with one TCI state, and the UE attempts to receive the DCI message across linked search space sets, then the UE may expend computational resources and experience time delays (e.g., resulting from attempting to receive and decode the DCI message in multiple linked search space sets), but without any beam diversity to enhance the likelihood of successful reception of the DCI message based on linking the search space sets. Thus, if the UE has been configured to link the search space sets, and receives and decodes the DCI message according to the linked search space sets regardless of whether beam diversity is available (e.g., regardless of a number of TCI states indicated by the network), the UE may sometimes expend computational resources and experience increased latency, regardless of whether beam diversity is available.

As described herein, a UE may receive first control signaling (e.g., a radio resource control (RRC) message) indicating that a first search space set and a second search space set are linked (e.g., a first group of PDCCH candidates in a first search space set and a second group of PDCCH candidates in a second search space set are linked). The UE may also receive second control signaling (e.g., a DCI message or a medium access control (MAC) control element (CE) indicating a number of TCI states (e.g., one TCI state or two TCI states). The UE may receive a DCI message in one PDCCH candidate (e.g., without linking the PDCCH candidates despite the first control signaling indicating that the PDCCH candidates may be linked) or may receive the DCI message in multiple PDCCH candidates (e.g., may receive a first repetition of the DCI message in a first PDCCH candidate in the first search space set, and may receive a second repetition of the DCI message in a second PDCCH candidate in the second search space set) based on how many TCI states are indicated in the second control information.

In some examples, if the second control information indicates two TCI states, then the UE may determine that the first search space set and the second search space set are linked (e.g., according to the first control information). If the first search space set and the second search space set are linked, the UE may determine that multiple repetitions of a same DCI message will be transmitted during PDCCH candidates of respective linked search space sets. In such examples, the UE may receive repetitions of the DCI message in linked PDCCH candidates of the respective search space sets (e.g., may attempt to receive, and combine, repetitions of the DCI message transmitted during one or more PDCCH candidate of each of the respective search space sets). If the second control information indicates one TCI state, then the UE may determine that the first search space set and the second search space set are not linked (e.g., despite the first control information). In such examples, instead of attempting to receive and decode the repetitions of the DCI in linked PDCCH candidates of the respective search space sets, the UE may attempt to receive a first DCI message in at least one PDCCH candidate of the first search space set, and may attempt to receive a second DCI message (e.g., different from the first DCI message) in at least one PDCCH candidate of the second search space set.

The subject matter described in the present disclosure may be implemented such that a wireless communications system may realize efficient use of computational resources, reduced power consumption, more efficient use of available system resources, efficient communications, and the like. For example, by flexibly determining whether to apply linking configured by the first control information, the UE may avoid expenditures of computational resources, power, and time when beam diversity is unavailable. The UE may similarly avoid expenditures of computation resources, power, and time, when coverage extension (e.g., PDCCH repetition using a same beam, frequency hopping, or both, which may support improved reception by, for example, low-power or low capacity UEs) is not the purpose of the linking between search space sets. However, by flexibly determining whether to apply linking configured by the first control information, the UE may still increase the likelihood of successful reception of DCI messages via PDCCH repetition when beam diversity or coverage enhancement is available. Further, a UE may more efficiently manage a BD budget (e.g., may more effectively perform BDs within a BD limit for a given slot), resulting in more efficient use of available resources.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to search space set linking with unified beam configurations.

FIG. 1 illustrates an example of a wireless communications system 100 that supports search space set linking with unified beam configurations in accordance with one or more aspects of the present disclosure. The wireless communications system 100 may include one or more base stations 105 (e.g., or other network entities), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node. In one aspect of this example, the first network node may be a UE 115, and the second network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). The communication link 135 may be or may include a sidelink. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

The wireless communications system 100 may support search space set linking with unified beam configurations. For example, UEs 115 may include a UE communications manager 101 and base stations 105 may include a network entity communications manager 102 that may each support flexible application of configured linking of PDCCH candidates in linked search space sets. The UE communications manager 101 may be an example of aspects of a communications manager as described in FIGS. 7 through 10. The network entity communications manager 102 may be an example of aspects of a communications manager as described in FIGS. 11 through 14.

By way of example, a UE 115 may receive first control signaling (e.g., a RRC message indicating that a first search space set and a second search space set are linked. The UE 115 may also receive second control signaling (e.g., a DCI message or a MAC-CE indicating a number of TCI states (e.g., one TCI state or two TCI states). Each TCI state may define one or more parameters for generating a directional beam (e.g., a beam 180) for transmitting uplink signaling or receiving downlink signaling. The UE 115 may receive a DCI message in one PDCCH candidate (e.g., without linking the PDCCH candidates despite the first control signaling indicating that the PDCCH candidates may be linked) or may receive the DCI message in multiple PDCCH candidates (e.g., may receive a first repetition of the DCI message in a first PDCCH candidate in the first search space set, and may receive a second repetition of the DCI message in a second PDCCH candidate in the second search space set) based on how many TCI states are indicated in the second control information. For example, if the second control information indicates two TCI states, then the UE may determine that the first search space set and the second search space set are linked (e.g., according to the first control information), and may receive repetitions of the DCI message in linked PDCCH candidates. If the second control information indicates one TCI state, then the UE 115 may determine that the first search space set and the second search space set are not linked (e.g., despite the first control information), and may receive a DCI message in one of the PDCCH candidates.

Figure 2:
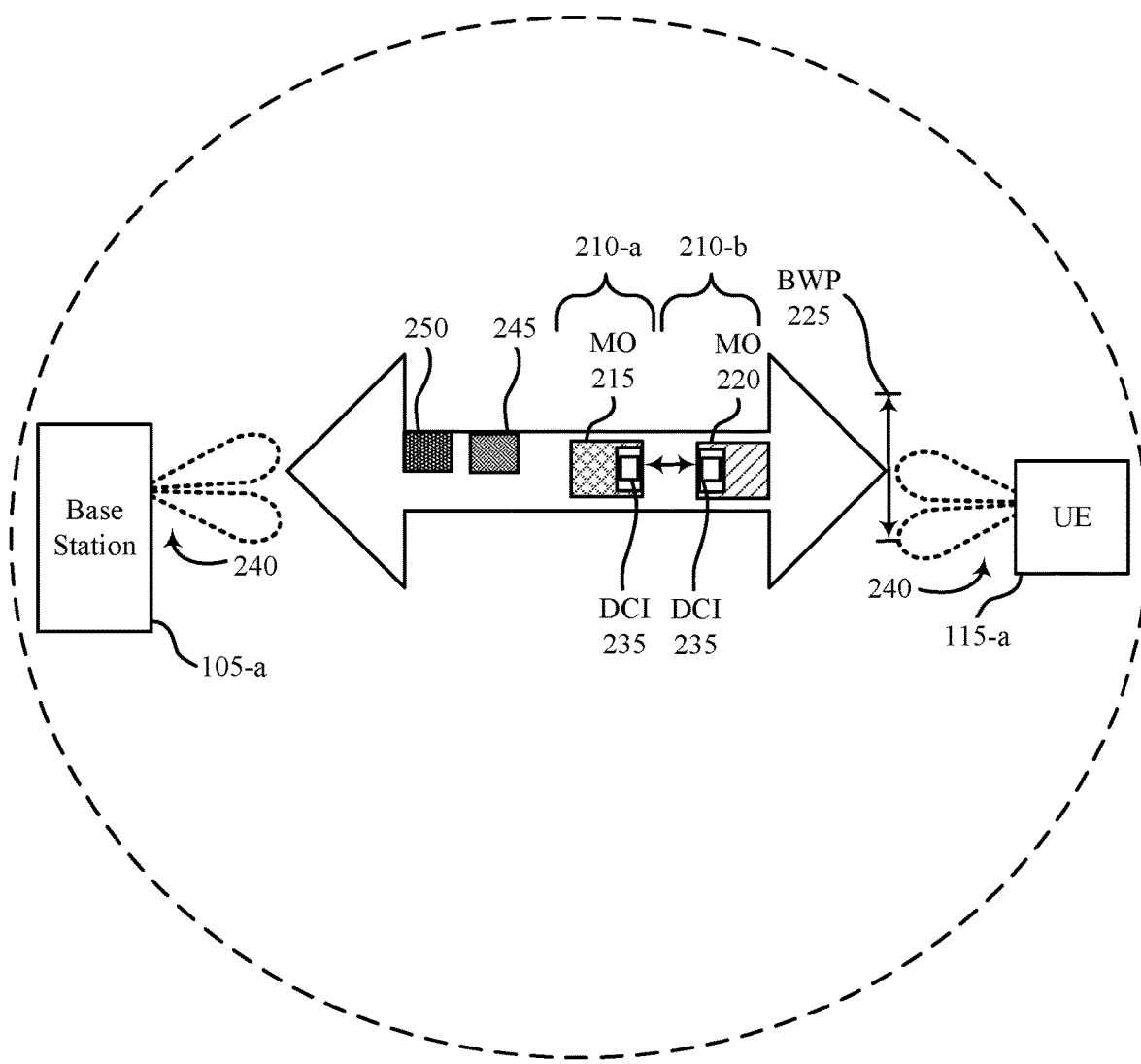
FIG. 2 illustrates an example of a wireless communications system that supports search space set linking with unified beam configurations in accordance with aspects of the present disclosure.
Figure 2:
Figure 2:
Figure 2:

FIG. 2 illustrates an example of a wireless communications system 200 that supports search space set linking with unified beam configurations in accordance with aspects of the present disclosure. Wireless communications system 200 may implement, or be implemented by, aspects of wireless communication system 100. For example, a wireless nodes (e.g., a UE 115-a and a base station 105-a) and may be an example of corresponding wireless nodes described with reference to FIG. 1.

A base station 105-a may configure a UE 115-a with multiple search space sets 205 (e.g., first search space set 205-a and second search space set 205-b). In some examples, the base station 105-a may configure multiple search space sets 205 (e.g., a first search space set 205-a and a second search space set 205-b) within a same transmission time interval (TTI) (e.g., a same slot), or across multiple TTIs (e.g., multiple slots). Each search space set 205 may include one or more time and frequency resources in which the UE 115-a many monitor for and receive downlink control signaling. In some examples, the time and frequency resources of a search space set 205 may be included in one or more MOs. For example, the first search space set 205-a may include MO 215, and the second search space set 220 may include MO 220.

The base station 105-a may also configure the UE 115 with a number of control resource sets (CORESETs) 210 (e.g., up to 3 CORESETs, up to 5 CORESETs, etc.) in a bandwidth part (BWP) 225 of a serving cell. The base station 105-a may configure the UE 115-a with a CORESET 210 via RRC signaling. Resource blocks (RBs) of a CORESET 210 may be defined in the frequency domain in terms of a number of symbols (e.g., 1 OFDM symbol, 2 OFDM symbols, or 3 OFDM symbols). Each search space set 205 may be associated with a single CORESET 210. For example, MO 215 may be associated with the first search space set 205-a, which may be associated with the first CORESET 210-a, and MO 220 may be associated with the second search space set 205-b, which may be associated with the second CORESET 210-b. Various configurations of MOs within search space sets 205 are described in greater detail with reference to FIG. 3.

The base station 105-a may configure a number of search space sets 205 (e.g., two search space sets, as illustrated with reference to FIGS. 2-6, or any number of search space sets 205, for example, up to 10 search space sets) in a BWP 225 of a serving cell. The base station 105-a may configure search space sets 205 (e.g., via RRC signaling) with an associated CORESET 210, monitoring slot periodicity and offset, monitoring symbols within slots, search space set types (e.g., common search space (CSS), UE-specific search space (USS)), DCI formats to monitor, numbers of PDCCH candidates 230 for a given aggregation level (AL) (e.g., a number of CCEs), or any combination thereof.

PDCCH candidates 230 may be defined as part of search space set configurations. PDCCH candidates 230 with a given AL (e.g., a number of CCEs) and a given candidate index may be defined in a given search space set 205. The UE 115-*a* may receive a DCI 235 in one or more PDCCH candidate 230 (e.g., as described in greater detail with reference to FIGS. 3-6). The UE 115-*a* may monitor PDCCH candidates 230 in one or more search space sets 205. For example, the UE 115-*a* may perform a blind decoding procedure (e.g., attempting to decode signaling received during a PDCCH candidate 230 to determine whether a cyclic redundancy check (CRC) passes, which would indicate the presence and successful decoding of a DCI 235) during a PDCCH candidate 230 in a MO of a particular search space set 205 associated with a CORESET 210. A PDCCH candidate 230 with a pass may correspond to a decoded DCI 235 (e.g., the UE may blind decode the PDCCH candidates 230 by attempting to decode any signaling detected during the resources of a PDCCH candidate 230, and if the CRC passes, the UE may successfully receive a DCI message transmitted by the base station).

In some examples of wireless communications systems, a base station 105-*a* may configure one or more beams 240 on which the UE 115-*a* is to communicate. For example, the base station 105-*a* may configure one or more transmission configuration indicator (TCI) states for the UE 115-*a*, as described in greater detail with reference to FIG. 4. In some examples, TCI states may be configured (e.g., via a DCI 235 including a beam indication) separately for different downlink channels or signals (e.g., TCI states specific to PDSCH, PDCCH, CSI-RS, or the like). However, as described herein (e.g., with reference to FIGS. 3-7), a TCI state or a set of TCI states may apply to all channels, signals, CORESETs, etc., after a determined time.

A wireless communications system may support PDCCH repetition. PDCCH repetition may include the base station 105-*a* transmitting multiple repetitions of a single transmission (e.g., a DCI 235), such that the receiving UE 115-*a* is more likely to receive at least one repetition of the downlink transmission, or is able to combine received repetitions to increase the likelihood of successful decoding of the downlink transmission. For instance, each repetition may refer to a PDCCH candidate 230, and two PDCCH candidates 230 may be linked together for repetition of a same DCI message. For instance, the base station 105-*a* may transmit first control information 250 (e.g., an RRC message) indicating that first search space set 205-*a* and second search space set 205-*b* are linked (e.g., indicating that PCCH candidates 230 in the first search space set 205-*a* are linked with PDCCH candidates 230 in the second search space set 205-*b*). Two PDCCH candidates 230 may have a same AL (e.g., a same number of CCEs), and the DCI payload transmitted using the two PDCCH candidates may be the same. That is, the base station 105-*a* may transmit a DCI payload (e.g., DCI 235) in a first PDCCH candidate 230 (e.g., in MO 215 of the first search space set 205-*a*) and may transmit the DCI payload again (e.g., the DCI 235) in a second PDCCH candidate 230 (e.g., in MO 220 of the second search space set 205-*b*). In such examples, the UE may perform soft combining to decode the DCI 235, or may attempt to individually decode the two PDCCH candidates 230.

In some examples, as described in greater detail with reference to FIGS. 3-7, the base station 105-*a* may transmit first control information 250 (e.g., an RRC message) indicating that the first search space set 205-*a* and the second search space set 205-*b* may be linked. The base station 105-*b* may also transmit second control information 245 (e.g., a DCI or MAC-CE) including information such as a beam indication (e.g., which may indicate one or two TCI states for generating beams 240). In some examples, the UE 115-*a* may determine whether to link the first search space set 205-*a* and the second search space set 205-*b*, based on a number of TCI states indicated in the second control information 245.

Figure 3:
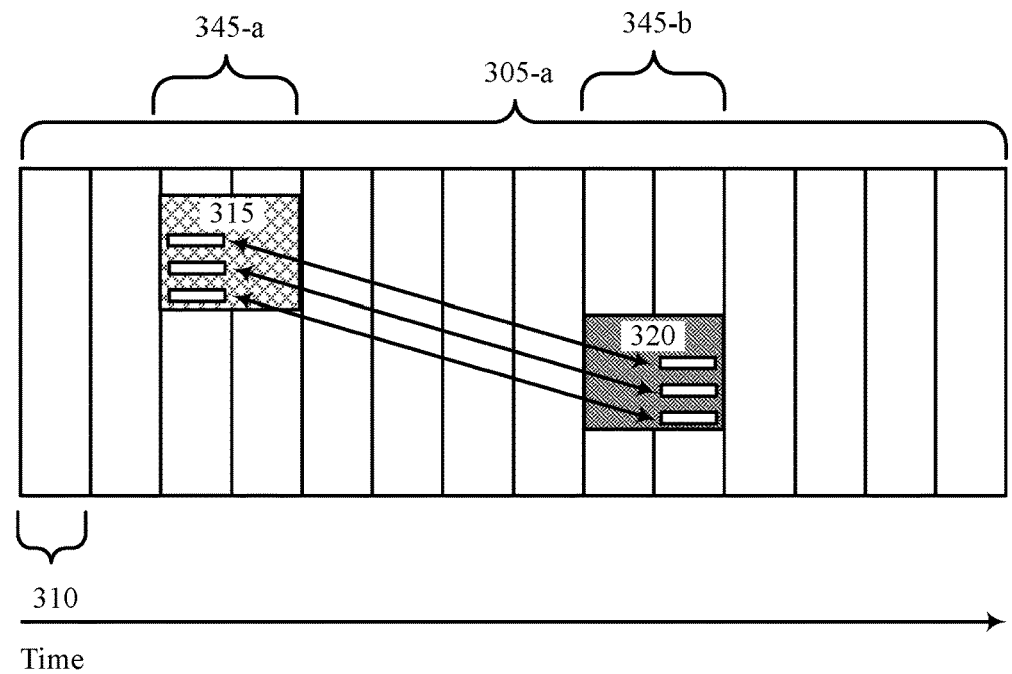
FIG. 3 illustrates an example of a timeline that supports search space set linking with unified beam configurations in accordance with aspects of the present disclosure.
Figure 3:
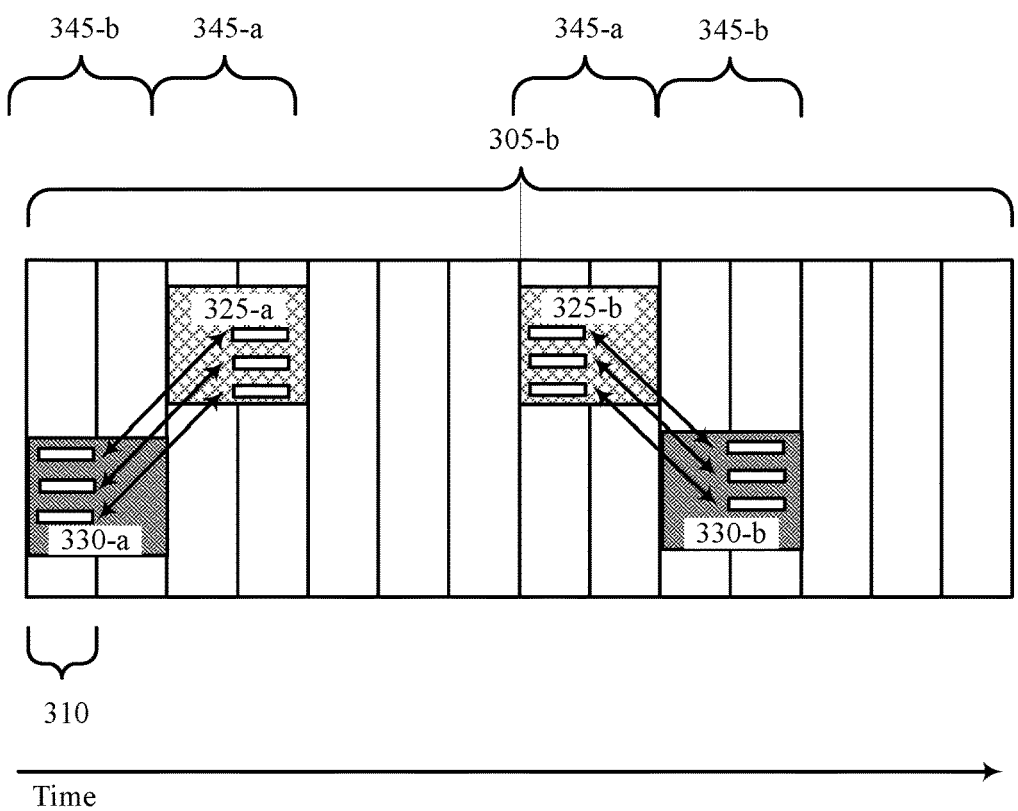
Figure 3:
Figure 3:
Figure 3:

FIG. 3 illustrates an example of a timeline 300 that supports search space set linking with unified beam configurations in accordance with aspects of the present disclosure. Timeline 300 may implement, or be implemented by, aspects of wireless communication system 100 or wireless communications system 200. For example, wireless nodes (e.g., a UE and a base station) may communicate according to timeline 300, and the wireless nodes may be examples of corresponding devices described with reference to FIG. 1 or FIG. 2.

As described in greater detail with reference to FIG. 2, a base station may configure a UE with multiple search space sets 340. In some examples, the base station may configure multiple search space sets 340 (e.g., a first search space set 340-*a* and a second search space set 340-*b*) within a same transmission time interval (TTI) (e.g., a same slot 305). The base station may also configure the UE with a number of CORESETs 345. The base station may configure the UE with the CORESETs 345 via RRC signaling. RBs of a CORESET 345 may be defined in the frequency domain in terms of a number of symbols 310 (e.g., 1 OFDM symbol, 2 OFDM symbols, or 3 OFDM symbols). Each search space set 340 may be associated with a single CORESET 345. For example (e.g., in slot 305-*a*), MO 315 may be associated with a first search space set 340-*a*, which may be associated with a first CORESET 345-*a*, and MO 320 may be associated with a second search space set 340-*b*, which may be associated with a second CORESET 345-*b*. In some examples, multiple MOs of multiple search space sets 340 may be located within a same TTI (e.g., slot 305-*b*). For example, MO 325-*a* and MO 325-*b* may be associated with a first search space set 340-*a*, which may be associated with the first CORESET 345-*a*, and MO 330-*a* and MO 330-*b* may be associated with a second search space set 340-*b*, which may be associated with the second CORESET 345-*b*.

The base station may configure search space sets 340 (e.g., via RRC signaling) with an associated CORESET 345, monitoring slot periodicity and offset, monitoring symbols within slots, search space set types (e.g., common search space (CSS), UE-specific search space (USS)), DCI formats to monitor, numbers of PDCCH candidates 335 for a given aggregation level (AL) (e.g., a number of CCEs), or any combination thereof.

PDCCH candidates 335 may be defined as part of search space set configurations. PDCCH candidates 335 with a given AL (e.g., a number of CCEs) and a given candidate index may be defined in a given search space set 345. The UE may receive a DCI message in one or more PDCCH candidate 335 (e.g., as described in greater detail with reference to FIGS. 3-6). The UE may monitor PDCCH candidates 335 in one or more search space sets. For example, the UE may perform a blind decoding procedure during a PDCCH candidate 335 in a MO of a particular search space set associated with a CORESET 345. A PDCCH candidate 335 with a cyclic redundancy check (CRC) pass may correspond to a decoded DCI (e.g., the UE may blind decode the PDCCH candidates 335, and if the CRC passes, the UE may successfully receive a DCI message transmitted by the base station).

In some examples of wireless communications systems, a base station may configure one or more beams on which the UE is to communicate. For example, the base station may configure one or more transmission configuration indicator (TCI) states for the UE, as described in greater detail with reference to FIG. 4. In some examples, TCI states may be configured (e.g., via a DCI message including a beam indication) separately for different downlink channels or signals (e.g., TCI states specific to PDSCH, PDCCH, CSI-RS, or the like). However, as described herein (e.g., with reference to FIGS. 3-6), a TCI state or a set of TCI states may apply to all channels, signals, CORESETs 345, etc., after a determined time.

A wireless communications system may support PDCCH repetition. PDCCH repetition may include a base station transmitting multiple repetitions of a single transmission (e.g., a DCI message), such that a receiving UE is more likely to receive at least one repetition of the downlink transmission, or is able to combine received repetitions to increase the likelihood of successful decoding of the downlink transmission. For instance, each repetition may refer to a PDCCH candidate 335, and two PDCCH candidates 335 may be linked together for repetition of a same DCI message. Two PDCCH candidates 335 may have a same AL (e.g., a same number of CCEs), and the DCI payload transmitted using the two PDCCH candidates may be the same. That is, the base station may transmit a DCI payload in a first PDCCH candidate 335 (e.g., in MO 315) and may transmit the DCI payload again in a second PDCCH candidate 335 (e.g., in MO 320). In such examples, the UE may perform soft combining to decode the DCI message, or may attempt to individually decode the two PDCCH candidates 335.

The UE may identify the linking (e.g., between the linked PDCCH candidates 335) prior to attempting the decoding of the DCI payload. The base station may transmit, to the UE, information (e.g., via RRC signaling) indicating that PDCCH candidates 335 of a first search space set 340-*a* are linked with PDCCH candidates 335 of a second search space set 340-*b*. In some examples, the number of MOs of two linked search space sets may be one-to-one mapped. PDCCH candidates 335 with a same AL and a same candidate index in the two linked search space sets may be linked. Two linked search space sets may be configured with a same number of PDCCH candidates 335 for each AL. In some examples (e.g., as illustrated with reference to slot 305-*a*), a first search space set 340-*a* including MO 315 may be linked with a second search space set 340-*b* including MO 320. Both search space sets may be configured with a same number of MOs (e.g., one MO for each search space set in slot 305-*a*). Similarly (e.g., as illustrated with reference to slot 305-*b*), a first search space set 340-*a* including MO 325-*a* and MO 325-*b* may be linked with a second search space set 340-*b* including MO 330-*a* and MO 330-*b*. Both search space sets may be configured with a same number of MOs (e.g., two MOs for each search space set in slot 305-*a*). The UE may determine that a first MO of the first search space set 340-*a* (e.g., MO 325-*a*) is linked with a first MO of the second search space set 340-*b* (e.g., MO 330-*a*). Individual PDCCH candidates 335 located in MO 325-*a* and MO 330-*a*, respectively, may be linked.

In some examples, procedures for receiving DCI may be impacted by linking search space sets and PDCCH candidates 335. For example, the UE may perform aspects of decoding a DCI message received via linked PDCCH candidates 335 (e.g., identifying a timeline, PUCCH resource determination, rate matching, or the like) based at least in part on a reference candidate. The UE may identify (e.g., designate) one of two linked PDCCH candidates 335 as a reference candidate, and may rely on the reference candidate to avoid ambiguity between the base station and the UE as to which of multiple repetitions (e.g., transmitted during both linked PDCCH candidates) are decoded successfully, which transmissions failed or should be retransmitted, etc. Decoding PDCCH candidates 335 according to a reference candidate may utilize more computational resources and may expend more power at the UE than decoding PDCCH candidates 335 without using a reference candidate, but may reduce ambiguity and increase the likelihood of successfully decoding a DCI message in linked PDCCH candidates 335. However, if two PDCCH candidates 335 are not linked, then the UE may decode a DCI message received in either of the PDCCH candidates 335 without identifying a reference candidate (e.g., one of a pair of linked PDCCH candidates 335, such as a first PDCCH candidate 335 in MO 315, or a second PDCCH candidate in MO 320). The identified reference candidate may be autonomously selected randomly selected, selected according to one or more rules, may be the first of the two PDCCH candidates 335 in time, or the last of the two PDCCH candidates 335 in time, or the like. Decoding a DCI message without identifying a reference candidate may expend less computational resources or power at the UE.

In some examples, a UE may count blind decoding procedures toward a blind decoding (BD) limit based on whether the PDCCH candidates are linked. The base station may configure the UE with a BD limit (e.g., for a given slot 305). The UE may perform a number of BDs up to (e.g., but not exceeding) the BD limit. The UE may count BDs differently based on whether search space sets are linked. For example, if two PDCCH candidates 335 are linked, then the UE may perform soft combining on the two PDCCH candidates 335. In such examples, the UE may attempt to decode a DCI message in the first linked PDCCH candidate (e.g., a first BD), may attempt to decode a DCI message in the second linked PDCCH candidate (e.g., a second BD), and may attempt to decode the DCI message by performing a soft combining procedure (e.g., combining control signaling received in the first PDCCH candidate 335 in the first search space set 340-*a* with control signaling received in the second PDCCH candidate 335 in the second search space set 340-*b*). The UE may count the soft combining procedure as a third BD toward the BD limit. However, of PDCCH candidates 335 are not linked, then the UE may consider each BD of individual PDCCH candidates 335 as a single BD toward the BD limit, which may result in more available BDs toward a BD limit for a slot.

Linking PDCCH candidates 335 may support PDCCH repetition, which may increase likelihood of successful receipt of DCI via coverage enhancement, beam diversity, or a combination thereof. However, in some examples, PDCCH repetition for beam diversity may be undermined if the UE is configured to apply a single beam to multiple CORESETs 345, as described in greater detail with reference to FIG. 4. In some examples, the UE may be configured to link PDCCH candidates 335. However, the UE may determine whether to apply the linking to PDCCH candidates 335 based on one or more rules or conditions, as described in greater detail with reference to FIGS. 3-6.

Figure 4:
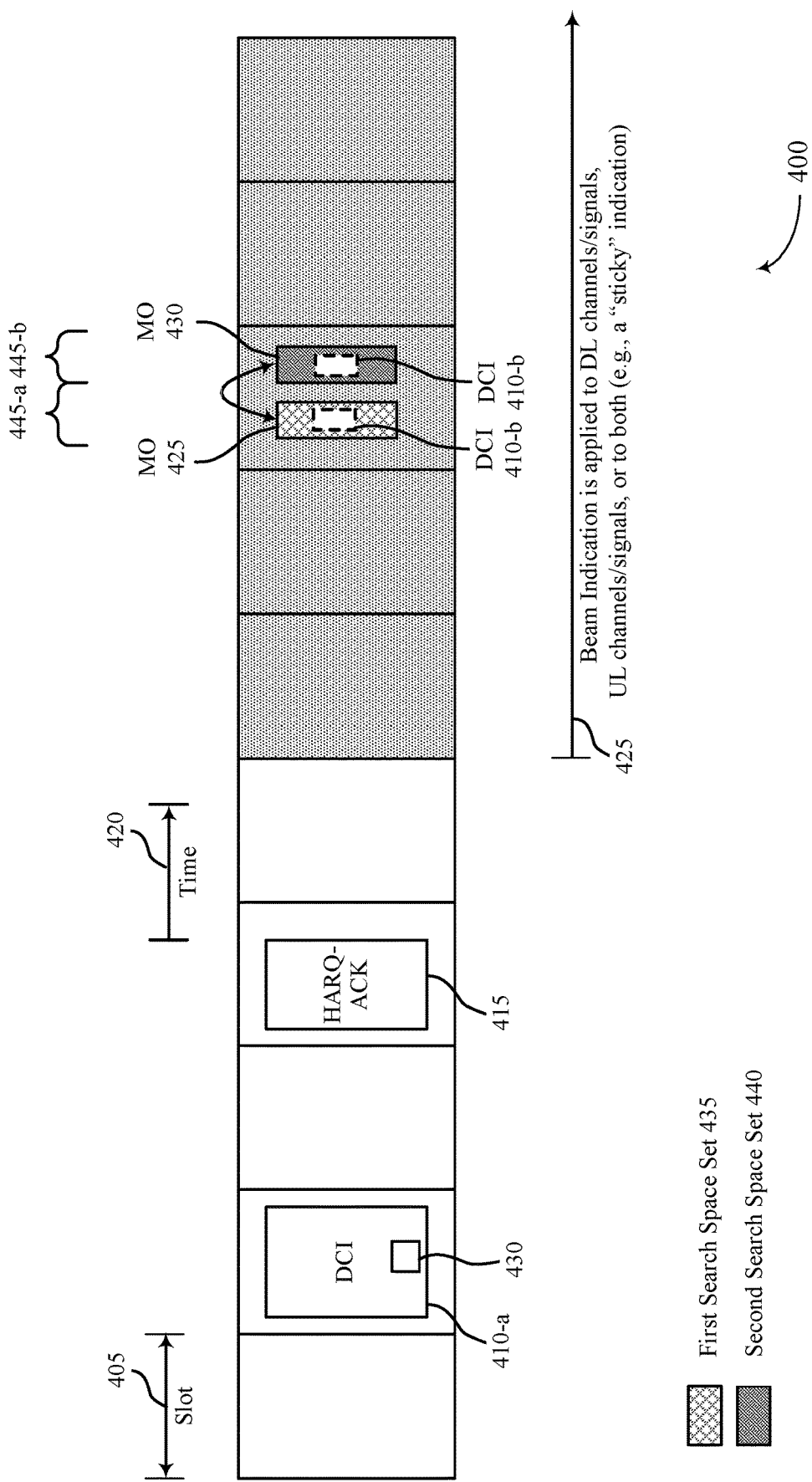
FIG. 4 illustrates an example of a timeline that supports search space set linking with unified beam configurations in accordance with aspects of the present disclosure.

FIG. 4 illustrates an example of a timeline 400 that supports search space set linking with unified beam configurations in accordance with aspects of the present disclosure. Timeline 400 may be implemented by one or more aspects of the wireless communications system 100 or wireless communications system 200, or timeline 300. For example, timeline 400 may be utilized by one or more network entities (e.g., base stations, TRPs associated with a base station, RRHs, network nodes, or the like), and a UE, which may be examples of corresponding devices as described with reference to FIGS. 1 and 2.

In the example of FIG. 4, a UE and a network entity may communicate in slots 405, in which one of the slots 405 may include a DCI 410-*a*, which may include a beam indication. The beam indication may be an indication of a number of TCI states, which may be conveyed via a TCI field codepoint 430 in the DCI 410. For example, the network entity may transmit, and the UE may receive, DCI 410 that indicates a TCI field codepoint (e.g., from two or more mapped TCI codepoints provided by a MAC-CE). As discussed herein, the TCI field codepoint may be mapped to one or multiple TCI states (e.g., one or more uplink TCI states, one or more downlink TCI states, one or more joint DL/UL TCI states, or any combinations thereof). For example, one TCI field codepoint may represent one or more joint downlink/uplink TCI state, which may be used for joint downlink/uplink beam indication. In another example, one TCI field codepoint may represent one or more pairs with a downlink TCI state and uplink TCI state, which may be used for separate downlink/uplink beam indication. In other examples, one TCI field codepoint may represent only one or more downlink TCI states, which may be used for downlink beam indication, or one TCI field codepoint may represent only one or more uplink TCI states, which may be used for uplink beam indication. In some cases, if the MAC-CE indicates the mapping to only a single TCI field codepoint, it may serve as a beam indication, and a separate beam indication in a beam indication DCI may not be used.

A UE that receives the DCI 410 with the TCI field codepoint may transmit a feedback indication, such as a HARQ-acknowledgment 415, to a base station or network entity that indicates successful receipt of the DCI 410. In some cases, the beam indication provided in the TCI field codepoint may be applied to communications starting a time period 420 (e.g., Y symbols, which may be predetermined, fixed, adjustable, configured by the network, or any combination thereof) after the HARQ-acknowledgment 415 (e.g., which may be an example of a determined time at which to apply the TCI state(s)). For example, the beam indication may be applied three milliseconds after HARQ-acknowledgment 415. In some cases, the time period 420 may be applied in the first slot that is at least Y symbols (e.g., which is RRC-configured based on UE capability) after the last symbol of a control channel transmission (e.g., a physical uplink control channel (PUCCH) transmission) carrying the HARQ-acknowledgment 415. In some cases, the beam indication may be a "sticky" indications in that it is not related to the scheduled shared channel communication (e.g., a physical downlink shared channel (PDSCH) transmission), and it is not a one-time indication. When the beam indication is applied, it remains the same for the applicable channels or signals until changed (e.g., until another MAC-CE or DCI format 1_1/1_2 changes the beam). In some cases, the beam indication may be common for multiple downlink channels or signals (e.g., PDSCH, PDCCH, CSI-RS) and/or multiple uplink channels or signals (PUSCH, PUCCH, SRS).

The TCI state or TCI states indicated in the TCI field codepoint 430 in the DCI 410 may be applied to all communications (e.g., all downlink channels or signals, all uplink channels or signals, or both) during time 425, until otherwise indicated by an updated TCI field codepoint (e.g., in a second DCI, as described in greater detail with reference to FIG. 4). The beam indication may not be related to specific channels (e.g., a PDSCH scheduled by the DCI 410), and may not be a one-time indication. When a beam indication is applied (e.g., at the beginning of time 425), the UE may use the same TCI state or two TCI states indicated by the beam indication for all subsequent applicable channels or signals until another DCI (e.g., DCI format 1_1 or DCI format 1_2) changes the beam. The beam indication may be for uplink communications (e.g., uplink TCI states), downlink communications (e.g., downlink TCI states), or both.

The UE may apply one or two TCI states to all CORE-SETs 445 during time 425 (e.g., CORESET 445-*a* associated with first search space set 435 and CORESET 445-*b* associated with second search space 440). For example, if the beam indication received via DCI 410 indicates a single TCI state, the UE may apply the TCI state to all UE-dedicated CORESETs 445 during time 425 (e.g., instead of a beam indication being per CORESET). CORESETs 445 may be based on a latest SSB (e.g., from a latest initial access procedure). For CORESETs 445 that are not CORESET0, associated with non-UE-dedicated reception on PDCCHs in a serving cell, a UE may be configured as to whether to apply the indicated beam or to follow default procedures (e.g., a MAC-CE activates a beam for that CORESET 560).

In some examples, as described in greater detail with reference to FIG. 5, the UE may be configured with linked search space set 435 and search space set 440. The search space sets may be linked for PDCCH repetition based on beam diversity. If the beam indication indicates two TCI states, then the UE may apply the two TCI states to the linked search space sets 435 and 440, resulting in beam diversity supporting PDCCH repetition. For instance, the UE may receive a first repetition of the DCI 410-*b* during MO 425 of the first search space set 435, and may receive a second repetition of the DCI 410-*b* during MO 430 of the second search space set 440. However, if the beam indication indicates one TCI state, then the UE may apply the single TCI state to linked search space sets 435 and 440. In such examples, the UE may expend computational resources performing BDs on linked PDCCH candidates, or may spend time attempting to decode PDCCH candidates without the enhanced reliability of beam diversity in PDCCH repetition. In such examples, the UE may implement techniques described herein to determine whether to consider PDCCH candidates linked or independent, and the UE may monitor PDCCH candidates and receive DCIs based on the determination (e.g., the UE may apply RRC configured linking between PDCCH candidates, or may ignore RRC configured linking between the PDCCH candidates).

Figure 5:
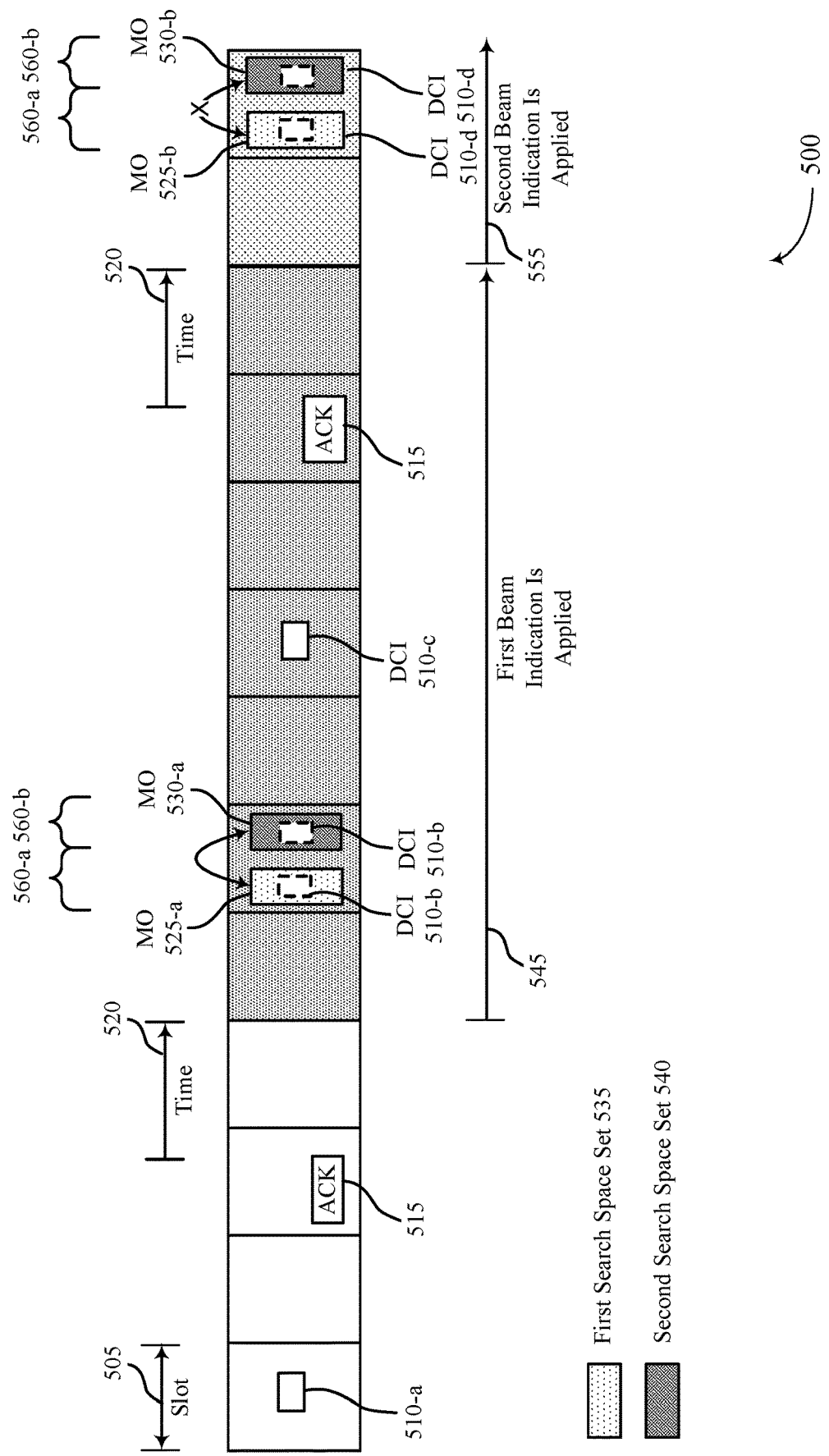
FIG. 5 illustrates an example of a timeline that supports search space set linking with unified beam configurations in accordance with aspects of the present disclosure.

FIG. 5 illustrates an example of a timeline 500 that supports search space set linking with unified beam configurations in accordance with aspects of the present disclosure. Timeline 500 may be implemented by one or more aspects of the wireless communications system 100. For example, timeline 500 may be utilized by one or more network entities (e.g., base stations, TRPs associated with a base station, RRHs, network nodes, or the like), and a UE, which may be examples of corresponding devices as described with reference to FIGS. 1-4.

In the example of FIG. 5, a UE and network entity may communicate in slots 505, in which one of the slots 505 may include a beam indication. For example, the network entity may transmit, and the UE may receive, DCI 510-*a* that indicates a TCI field codepoint (e.g., from two or more mapped TCI codepoints provided by a MAC-CE). As discussed herein, the TCI field codepoint may be mapped to one or multiple TCI states (e.g., one or more uplink TCI states, one or more downlink TCI states, one or more joint DL/UL TCI states, or any combinations thereof). For instance, unified TCI states (e.g., a TCI field codepoint that maps to one or two TCI states) may support mTRP schemes.

A UE that receives the DCI 510-a with the TCI field codepoint may transmit a feedback indication, such as a HARQ-acknowledgment 515, to a base station or network entity that indicates successful receipt of the DCI 510-a. In some cases, the beam indication provided in the TCI field codepoint may be applied to communications starting in a first slot after a time period 520 (e.g., Y symbols) after the HARQ-acknowledgment 515 (e.g., which may be an example of a determined time at which to apply the TCI states). In some cases, the beam indication may be a "sticky" indications in that it is not related to the scheduled shared channel communication (e.g., a PDSCH transmission), and it is not a one-time indication. When the beam indication is applied, it remains the same for the applicable channels or signals until changed (e.g., another MAC-CE or DCI format 1_1/1_2 changes the beam). In some cases, the beam indication may be common for multiple downlink channels or signals For PDCCH repetition with different beams, a unified TCI mechanism may be applied to indicate two TCI states (e.g., downlink TCI states or joint TCI states) to indicate a beam for two corresponding groups of CORESETs 560. A first TCI state may be associated with a first group of CORESETs 560 and a second TCI state may be associated with a second group of CORESETs 560. In some examples CORESET0 may not belong to either a first group or a second group. Additionally, or alternatively, CORESETs associated with non-UE-dedicated reception on a PDCCH may or may not belong to one of the groups of CORESETs 560 (e.g., as configured via RRC signaling). CORESET 560-a and CORESET 560-b may belong to the same group of CORESETs 560, or to separate groups of CORESETs 560.

As described with reference to FIG. 3, the base station may indicate, to the UE, a linking between search space sets. For example, the base station may configure a first search space set 535 including MOs 525, and a second search space set 5540 including MOs 530. Each of MOs 525 and MOs 530 may include a number of PDCCH candidates (e.g., PDCCH candidates 335 as described with reference to FIG. 3). The base station may also indicate that the first search space set 535 is linked with the second search space set 540. The UE may determine (e.g., based on an indication from the base station) that PDCCH candidates from the first search space set 535 may be linked with PDCCH candidates from the second search space set 540. Thus, PDCCH candidates in MO 525-a may be linked with PDCCH candidates in MO 530-a, as described in greater detail with reference to FIG. 2.

In some examples (e.g., to support PDCCH repetition), the base station may indicate (e.g., in a TCI field codepoint in DCI 510-a) two TCI states. The UE may apply the first TCI state of the pair of TCI states to a first group of CORESETs 560 (e.g., which includes a CORESET 560-a that is associated with the first search space set 535) and may apply the second TCI state of the pair of TCI states to a second group of CORESETs (e.g., which includes a CORESET 560-b that is associated with the second search space set 540). For example, the UE may monitor PDDCH candidates (e.g., to receive DCI 510-b) in MO 525-a using the first TCI state, and may monitor PDCCH candidates (e.g., to receive the DCI 510-b) in MO 530-a using the second TCI state. In some examples (e.g., for PDCCH repetition), the UE may apply the configured linking between PDCCH candidates in MO 525-a and MO 530-a. In such examples, the UE may perform a first BD in a first PDCCH candidate in the MO 525-a, may perform a second BD in a second PDCCH candidate in the MO 530-a, and may also perform a soft combining procedure (e.g., which the UE may count as a third BD toward a BD limit) to receive DCI 510-b in both linked PDCCH candidates. The UE may also attempt to decode the DCI 510-b (e.g., and transmit HARQ-ACK signaling to the base station) based on a reference PDCCH candidate (e.g., the UE may designate one of the two PDCCH candidates as the reference candidate for determining a timeline, resource determination, rate matching, feedback signaling, etc.). The UE may take more time to receive DCI 510-b based on the linking, and may expend more computational resources to perform the soft combining procedure. However, the UE may also be more likely to successfully receive the DCI 510-b based on beam diversity (e.g., and the PDCCH repetition or mTRP deployment) based on applying the linking between the PDCCH candidates.

In some examples, after applying the beam indication received in the TCI field codepoint (e.g., a TCI field codepoint 430 as illustrated with reference to FIG. 4) of the DCI 510-a (e.g., after utilizing two TCI states) during time 515, the base station may transmit a second beam indication (e.g., in DCI 510-c). The DCI 510-c may indicate a single TCI state. After time period 520 (e.g., after the PUCCH resources on which the UE transmits HARQ ACK 510-c corresponding to the DCI 510-c), the UE may apply the second beam indication (e.g., may utilize the one TCI state indicated by DCI 510-c to receive control information from the base station) during time period 555. In such examples, the UE may monitor PDCCH candidates in MO 525-b and MO 530-b using the one TCI state.

If the UE applies a configured linking between PDCCHs in the first search space and the second search space set 540 (e.g., in MO 525-a and MO 525-b), then the UE may take more time to receive DCI 510-b based on the linking, and may expend more computational resources to perform the soft combining procedure. Additionally, the UE may count combined PDCCH candidates as a third BD toward a BD limit. However, the UE may not increase the likelihood of receiving a DCI 510-d based on beam diversity (e.g., because of the one TCI state indicated by the DCI 510-c). For instance, mTRP repetitions support beam diversity. But if both PDCCH repetitions use a same beam, and if the UE applies search space set linking, then the UE may decode the DCI 510-c using a reference PDCCH candidate for some processes including determining a transmission timeline (e.g., expending computational resources, and increasing latency). The UE may also count three BDs (e.g., instead of two BDs for independent unlinked PDCCH candidates) toward a BD limit, decreasing a BD budget and decreasing the number of PDCCHs the UE is capable of monitoring (e.g., which may limit the downlink control signaling the UE is able to successfully receive).

Additionally, or alternatively, PDCCH repetition may be configured for coverage enhancements (e.g., instead of beam diversity). For example, two linked search space sets may be associated with a same CORESET, or may be associated with different CORESETs with the same TCI state. In such examples, the UE may apply linking between search spaces using one or two TCI states, and may support coverage enhancements based on PDCCH repetition using a single TCI state.

As described herein, a UE may be configured to link search space sets. However, in some examples, if the UE applies a beam indication (e.g., indicating one TCI state) to the search space sets, it may be efficient to decode DCIs 510 independently (e.g., instead of applying the linking). For example, if the search space sets are linked for the purpose of beam diversity and the UE applies a single TCI state to linked search space sets, the UE may unnecessarily experience time delays, may expend computational resources and power unnecessarily, or the like. However, if search space sets are linked for the purpose of coverage enhancements, then the UE may experience coverage enhancements by linking the search space sets using a single TCI state. Thus, a UE may determine, based on one or more rules or conditions being satisfied, whether to apply a linking of search space sets (e.g., as configured by the base station via RRC signaling).

The UE may determine how a beam indication DCI 510 impacts linking between search space sets and PDCCH candidate linking, and how the UE interprets and decodes a DCI transmitted by the base station during one or more PDCCH candidates. In some examples, the UE may be configured (e.g., via RRC signaling) to link PDCCH candidates of the first search space set 535 and the second search space set 540 for PDCCH repetition, and may receive a beam indication (e.g., the DCI 510-c). If the beam indication indicates one TCI state (e.g., a downlink TCI state or a joint TCI state) to be applied to all CORESETs starting in the slot that the TCI state is applied (e.g., the time period 545 starting in the first slot after Y symbols after ACK 510-c), then the UE may assume that the search space sets are individual (e.g., are not linked). The UE may receive the DCI 510-d in a first PDCCH candidate in MO 525-b, or may receive the first PDCCH candidate in MO 530-b (e.g., but not both). In such examples, interpretation (e.g., decoding) of a detected DCI 510-d in a PDCCH candidate in any of the two search space sets (e.g., in MO 525-b or MO 530-b) may not be based on a reference candidate. That is, the UE may determine that the PDCCH candidates in MO 525-b are not linked with MO 530-b (e.g., despite having received RRC signaling configuring the first search space set 535 and the second search space set 540 to be linked), and may therefore not designate either of a first PDCCH candidate in MO 525-b or a second PDCCH candidate in MO 530-b as a reference candidate. The UE may therefore have no need to use a reference candidate for timing determination, resource determination, feedback signaling, rate matching, or the like. Additionally, or alternatively, the UE may count each PDCCH candidate in any of the search space sets as one BD (e.g., two PDCCH candidates from the two search space sets may be counted as two BDs, and not three BDs toward a BD limit). Determining that PDCCH candidates in MO 525-b and MO 530-b are individual (e.g., not linked) based on a beam indication indicating one TCI state may result in the UE avoiding unnecessary expenditures of computational resources, unnecessary time delays and increased latency, and may result in improved user experience.

If a beam indication indicates two TCI states, then the UE may determine that PDCCH candidates in two linked search space sets are linked (e.g., are not individual). For example, a beam indication (e.g., DCI 510-a) may indicate two TCI states (e.g., downlink TCI states or joint TCI states) to be applied to one or more CORESETs (e.g., two groups of CORESETs) starting from the slot that the two TCI states are applied (e.g., during time period 545), the UE may assume search space set linking between the first search space set 535 and the second search space set 540 (e.g., as configured to be linked via RRC signaling). In such examples, the UE may receive repetitions of the DCI 510-b across multiple PDCCH candidates. For instance, the UE may receive a first repetition of DCI 510-b during a PDCCH candidate in MO 525-a, and may receive a second repetition of DCI 410-b during a PDCCH candidate in MO 530-a. In some examples, the UE may also perform a soft combining procedure and may decode aspects of the DCI 510-b received during MO 525-a and during MO 530-a. The UE may interpret the detected DCI 510-b in PDCCH candidates in both search space sets based on a reference candidate (e.g., the PDCCH candidates are assumed to be linked). Additionally, or alternatively, the UE may count the first PDCCH candidate in MO 525-a and the second PDCCH candidate in MO 530-a as three BDs (e.g., instead of two BDs). That is, two PDCCH candidates from the two search space sets (e.g., with the same index and the same AL) may be counted as three BDs toward a BD limit if the UE has determined to count two linked PDCCH candidates as three BDs.

In some examples, the UE may apply one or more rules as described with reference to FIG. 5 (e.g., the UE may determine that search space sets are linked if a beam indication indicates two TCI states, and may determine that search space sets are not linked if a beam indication indicates one TCI state) if one or more additional conditions are satisfied, as described in greater detail with reference to FIG. 6.

Figure 6:
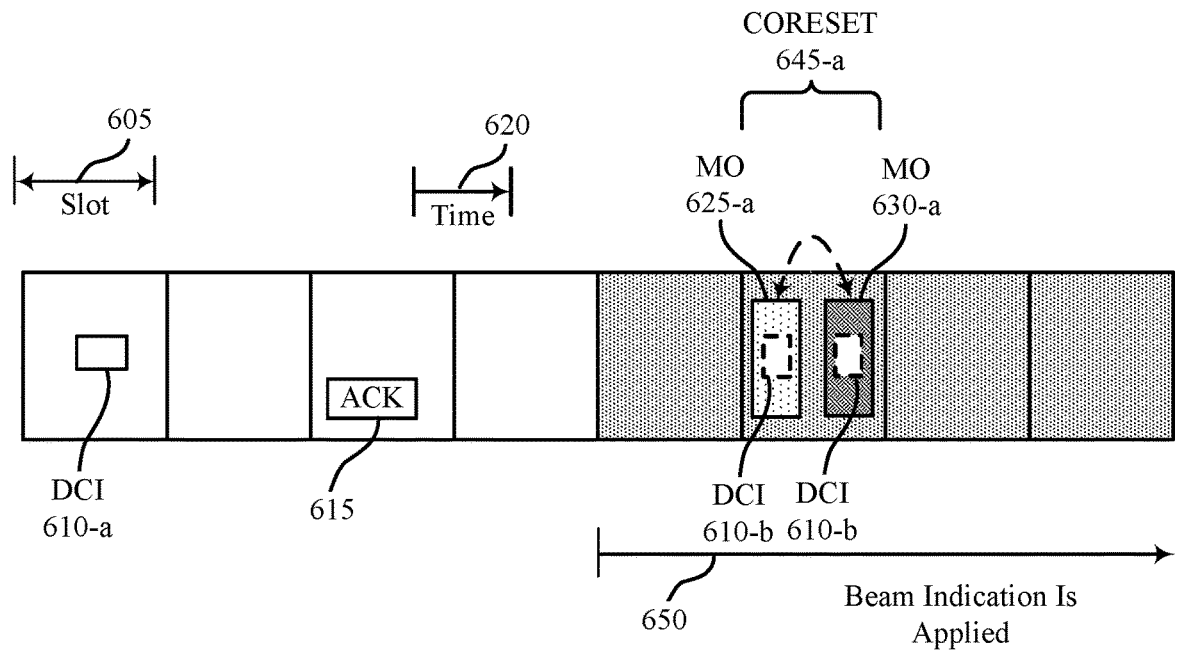
FIG. 6 illustrates an example of a timeline that supports search space set linking with unified beam configurations in accordance with aspects of the present disclosure.
Figure 6:
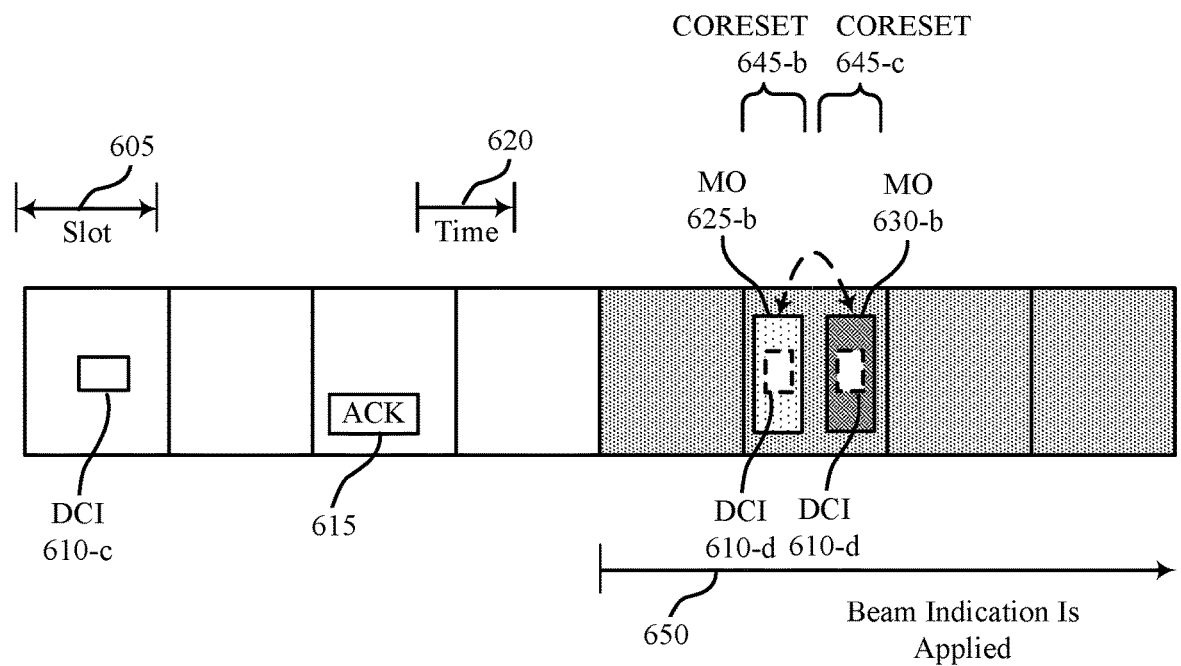
Figure 6:
Figure 6:

FIG. 6 illustrates an example of a timeline 600 that supports search space set linking with unified beam configurations in accordance with aspects of the present disclosure. Timeline 600 may be implemented by one or more aspects of the wireless communications system 100. For example, timeline 600 may be utilized by one or more network entities (e.g., base stations, TRPs associated with a base station, network nodes, or the like), and a UE, which may be examples of corresponding devices as described with reference to FIGS. 1-5. The UE and the base station may communicate during one or more slots 605.

As described in greater detail with reference to FIG. 4, a base station may configure a UE with one or more search space sets (e.g., first search space set 635 and second search space set 640). Each search space set may include one or more MOs (e.g., MOs 625 associated with first search space set 635 and MOs 630 associated with second search space set 640). Each MO may include one or more PDCCH candidates. In some examples, search space sets may be associated with one or more CORESETs. The base station may transmit (e.g., via RRC signaling) an indication of a linking between first search space set 635 and second search space set 640. In such examples, PDCCH candidates in an MO 625 may be linked with PDCCH candidates in MOs 630. A DCI 610-a may include a beam indication, which may indicate one or two TCI states. The UE may transmit an ACK 615, and may apply the one or two TCI states during time period 650 (e.g., upon expiration of time 620 after transmission of an ACK message associated with the DCI 610).

In some examples, the UE may determine whether to consider PDCCH candidates in first search space set 635 and second search space set 640 linked (e.g., as indicated in the RRC signaling) or individual (e.g., despite the RRC signaling). As described with reference to FIG. 4, the UE may make such a determination based on one or more rules (e.g., one or more behaviors for the UE to follow under certain conditions, defined or described in one or more standard documents or regulatory bodies). For example, if the beam indication indicates one TCI state, then the UE may receive a DCI 610 individually in a PDCCH in an MO 625 or an MO 630 (e.g., without linking). If the beam indication indicates two TCI states, then the UE may receive repetitions of a DCI 610 during respective PDCCHs in both an MO 625 and a MO 630.

In some examples, the UE may apply such a rule based on one or more conditions being satisfied. For example, the base station may control such behavior via separate RRC configuration. The base station may transmit an RRC message to the UE, indicating whether the UE is enabled to apply such a rule (e.g., whether the UE is enabled to ignore a configured linking between first search space set 635 and second search space set 640 if the beam indication indicates one TCI state). If such behavior is not enabled via RRC signaling, then the UE may confirm to the configured search space set linking (e.g., may assume linking between PDCCH candidates in linked search space sets during time period 650 even if one TCI state is applied to all CORESETs). For example, if the base station implements PDCCH repetition for coverage enhancements, then the base station may disable (e.g., or may refrain from enabling) rules that permit the UE to ignore the linking of PDCCH candidates according to the rule. Similarly, if the base station implements PDCCH repetition for beam diversity, then the base station may enable the rules that permit the UE to ignore the linking of PDCCH candidates according to the one or more rules.

In some examples, the UE may apply the one or more rules based on whether a CORESET associated with the two search space sets (e.g., that have been linked via RRC signaling) are the same or different. For example, If the first search space set 635 and the second search space set 640 are associated with the same CORESET 645-*a*, then the UE may not follow the rule (e.g., the behavior in which the UE may or may not apply the configured linking between the two search space sets). For instance, the beam indication received via the DCI 610-*a* may indicate one or two TCI states, and the base station may indicate that the first search space set 635 and the second search space set 640 are linked. The base station may further configure one or more CORESETs, and both the first search space set 635 and the second search space set 640 may be associated with the CORESET 645-*a*. In such examples, the UE may assume that the PDCCH candidates of first search space set 635 are linked with PDCCH candidates of second search space set 640 (e.g., even if the beam indication indicates one TCI state for all CORESETs during time period 650). For example, if the base station configures the first search space set 635 and the second search space set 640 with a single CORESET 645-*a*, then it is likely that the purpose of PDCCH repetition is not beam diversity (e.g., may be coverage enhancements supported by PDCCH repetition using a same beam). In such examples, the UE assume that the PDCCH candidates of MO 625-*a* are linked with PDCCH candidates of MO 630-*a*, and may receive repetitions of DCI 610-*b* during both MO 625-*a* and MO 630-*a* (e.g., using a single TCI state).

In some examples, the UE may determine whether to apply the one or more rules based on whether the CORESETs associated with the linked search space sets belong to different groups of CORESETs or a single group of CORESETs. For example, the base station may configure the UE with one or more groups of CORESETs. CORESET 645-*b* may be associated with the first search space set 635, and CORESET 645-*c* may be associated with second search space set 640. If CORESET 645-*b* and CORESET 645-*c* belong to different groups of CORESETs, then the UE may apply the one or more rules (e.g., may determine that PDCCH candidates of the linked search space sets are linked if the beam indication indicates two TCI states, and may determine that the PDCCH candidates of the linked search space sets are individual (e.g., are not linked) if the beam indication indicates one TCI state).

CORESET 645-*b* and CORESET 645-*c* may belong to the same group of CORESETs. In some examples, the UE may assume linking between PDCCH candidates in the first search space set 635 and the second search space set 640 regardless of whether the beam indication indicates one or two TCI states based on the CORESET 645-*b* and the CORESET 645-*c* belong to the same group of CORESETs. For instance, the base station may configure the CORESET 645-*b* associated with the first search space set 635 and the CORESET 645-*c* associated with the second search space set 640 to be associated with a single group of CORESETs to support PDCCH repetition for overage enhancement (e.g., not beam diversity). Thus, the UE may determine that PDCCH candidates in linked search space sets are linked to support PDCCH repetition (e.g., even if only one TCI state is indicated in the beam indication), and may receive. In some examples, the UE may apply the one or more rules (e.g., may not assume that PDCCH candidates in linked search space sets are automatically linked, and may determine whether to link the PDCCH candidates based on the one or more rules) if CORESET 645-*b* and CORESET 645-*c* are part of the same group of CORESETs. For instance, grouping of CORESETs may be more dynamic than RRC configuration. In such examples, the DCI 610-*c* that two TCI states to be applied may also indicate each TCI state is applied to which CORESET.

In some examples, one or both of CORESET 645-*b* and CORESET 645-*c* may not belong to any CORESET group. In such examples the UE may always assume configured search space set linking (e.g., may link PDCCH candidates of linked search space sets) irrespective of if one or two TCI state are indicated in the beam indication (e.g., the UE may not apply the one or more rules if one of CORESET 645-*b* and CORESET 645-*c* is not part of a group of CORESETs). For example, CORESET 645-*b* or CORESET 645-*c* may be a CORESET 0, or may be associated with non-UE-dedicated reception on a PDCCH which are configured not to follow the TCI state of the beam indication. If the beam indication received via DCI 610-*c* indicates one or two TCI states, but the indicated one or two TCI states do not apply to CORESET 645-*b* or CORESET 645-*c*, then the UE may receive the DCI 610-*d* during MO 625-*b* and during MO 630-*b* based on linking PDCCH candidates in MOD 625-*b* and MO 625-*b* (e.g., regardless of whether the beam indication indicates one or two TCI states). Such procedures may support more dynamic search space set linking based on whether TCI states of CORESETs 645 are the same (e.g., when one TCI state is indicated to be applied) or different (e.g., when two TCI states are indicated to be applied). However, if one or more of the two CORESETs 645 do not follow the beam indication, then such dynamic search space set linking may not be supported.

Figure 7:
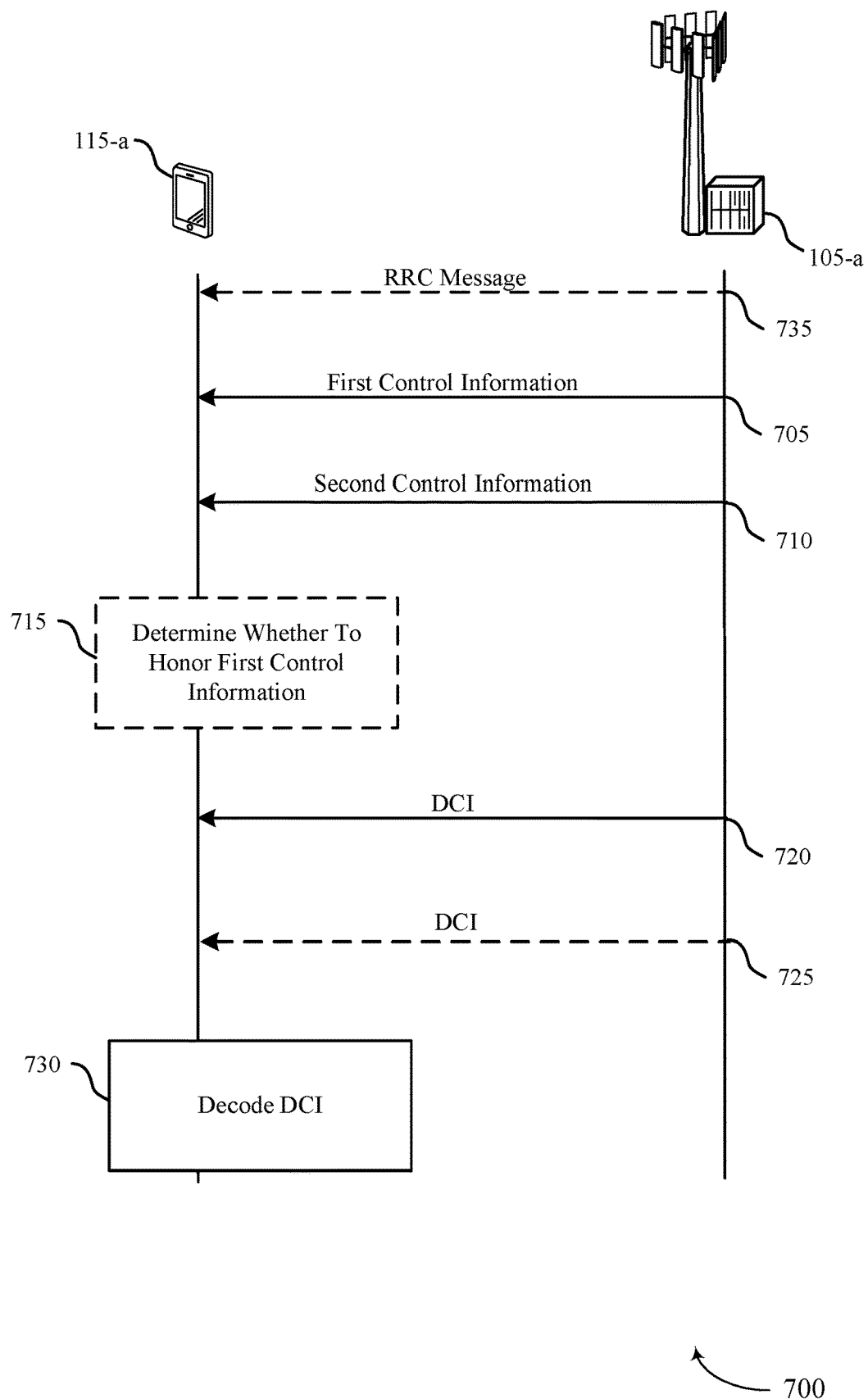
FIG. 7 illustrates an example of a process flow that supports search space set linking with unified beam configurations in accordance with aspects of the present disclosure.

FIG. 7 illustrates an example of a process flow 700 that supports search space set linking with unified beam configurations in accordance with aspects of the present disclosure. The process flow 700 may include a UE 115-*b* and a network entity (e.g., a base station 105-*b* a base station, a RRH, a network-controlled entity, a network node, a TRP, or the like), which may be examples of corresponding devices with reference to wireless communications system 100. The UE 115-*b* may be an example of a first network node (e.g., a UE) as described with reference to FIGS. 1-5, and the base station 105-*b* may be an example of a second network node (e.g., a base station, TRP, etc.) as described with reference to FIGS. 1-5. The UE 115-b and the base station 105-b may implement techniques described with reference to FIGS. 1-5.

At 705, the UE 115-b may receive (e.g., from the base station 105-b) first control information. The first control information may be higher layer signaling (e.g., an RRC message). The first control information may indicate that two or more search space sets may be linked. For example, the first control information may indicate that a first group of PDCCH candidates in a first search space set are linked with a second group of PDCCH candidates in a second search space set.

At 710, the UE 115-b may receive (e.g., from the base station 105-b) second control information. The second control information may be a DCI message or a MAC-CE. The Second control information may indicate one or more TCI states (e.g., one or two TCI states). The one or more TCI states may be used for at least a subset of communications (e.g., all or most CORESETs) between the UE 115-b and the network (e.g., the base station 105-b). For example, the second control information may include a beam indication that is sticky, such that it applies to all CORESETs subsequent to a determined time (e.g., a fixed time after the UE 115-b transmits a feedback message corresponding to the second control information).

At 715, the UE 115-b may determine whether to honor aspects of the first control information. For example, the UE 115-b may determine whether to receive and interpret (e.g., decode) one or more DCI messages according to the linking of search space sets configured in the first control information, or to refrain from linking search space set candidates (e.g., to ignore, not honor, or otherwise discard the linking configured at 705). In some examples, the UE 115-b may determine to link the search space sets (e.g., as configured at 705) if the second control information indicates two TCI state. In some examples, the UE 115-b may determine not to link the search space sets (e.g., despite the configuration information received at 705) if the second control information indicates one TCI state.

At 720, the UE 115-b may receive a DCI message (e.g., from the base station 105-b) in one or multiple PDCCH candidates, based at least in part on the number of TCI states indicated in the second control information (e.g., one TCI state or two TCI states). The UE 115-b may receive the DCI message in a single PDCCH candidate (e.g., the first PDCCH candidate in the first MO associated with the first search space set, or the second PDCCH candidate in the second MO associated with the second search space set) if the second control information indicates a single TCI state (e.g., the UE may determine not to link the search space sets at 715). The UE 115-b may receive the DCI message in multiple PDCCH candidates (e.g., the first PDCCH candidate in the first MO associated with the first search space set, and the second PDCCH candidate in the second MO associated with the second search space set) if the second control information indicates two TCI states (e.g., the UE may determine to link the search space sets at 715).

If the UE 115-b receives the DCI message at 720 in a single PDCCH candidate (e.g., refrains from linking the first and second groups of PDCCH candidates), then UE 115-b may decode the DCI message at 730 (e.g., may determine that PDCCH candidates in the two linked search space sets are not linked). In such examples, the UE 115-b may count a first PDCCH candidate in the first search space set (e.g., where the UE 115-b received the first DCI message at 720) toward a BD limit for a slot, and may count a second PDCCH candidate in the second search space set (e.g., where ethe UE receives a second DCI message at 725 in the second PDCCH candidate) toward the BD limit of the slot (e.g., where the first MO including the first PDCCH candidate and the second MO including the second PDCCH candidate are located in the same slot). Additionally, or alternatively, if the UE 115-b receives the DCI message at 720 (e.g., in a single PDCCH candidate without linking), then the UE 115-b may receive a second DCI message at 725 in a second PDCCH candidate, and may decode the two DCI messages independently from each other (e.g., without reference to a candidate PDCCH candidate).

If the UE 115-b receives the DCI message at 720 in a multiple PDCCH candidates (e.g., links the first and second groups of PDCCH candidates), then UE 115-b may receive a first repetition of the DCI message at 720 and may receive a second repetition of the DCI message at 725. The UE may decode the received DCI message at 730 (e.g., may determine that PDCCH candidates in the two linked search space sets are linked). In such examples, the UE 115-b may count a first PDCCH candidate in the first search space set (e.g., where the UE 115-b received the repetition of the DCI message at 720) toward a BD limit for a slot, and may count a second PDCCH candidate in the second search space set (e.g., where the UE receives the second repetition of the DCI message at 725 in the second PDCCH candidate) toward the BD limit of the slot (e.g., where the first MO including the first PDCCH candidate and the second MO including the second PDCCH candidate are located in the same slot). The UE 115-b may also perform a soft combining procedure (e.g., may attempt to decode at least portions of the repetitions of the DCI message, and combine aspects of the received repetitions to increase the likelihood of successful reception of the DCI message), and may count a combination of the first PDCCH candidate and the second PDCCH candidate as a third BD toward the BD limit of the slot. Additionally, or alternatively, if the UE 115-b receives the first repetition of the DCI message at 720 and the second repetition of the DCI message at 725, the UE 115-b may designate one of the two PDCCH candidates as a reference candidate, and may decode the DCI message according to a determined timing, rate matching, etc. based at least in part on designated reference PDCCH candidate.

The base station 105-b may determine whether to transmit repetitions of a DCI message at 720 and 725, respectively, or to transmit separate DCI messages at 720 and 725, respectively, based on the one or more rules or conditions described herein. For example, if the base station 105-b indicates one TCI state in the second control information, then the base station 105-b may transmit the DCI message in a single PDCCH candidate at 720 (e.g., instead of multiple repetitions of the DCI message in linked PDCCH candidates). If the base station 105-b indicates two TCI states in the second control information, then the base station 105-b may transmit repetitions of the DCI message in linked PDCCH candidate at 720 and 725, respectively.

In some examples, the UE 115-b may receive (e.g., from the base station 105-b at 735) an RRC message enabling the UE to determine whether to apply the linking (e.g., configured in the first control information). For example, the RRC message may enable the UE to determine whether to honor first control information at 715. If the UE 115-b receive the RRC message (e.g., an RRC parameter that enables or disables the determination at 715), then the UE 115-b may determine whether to honor the linking configuration received in the first control information. If the UE does not receive the RRC message at 735 (e.g., or if the RRC message disables the UE from determining whether to honor the first control information), then the UE 115-*b* may link the first search space set and the second search space set (e.g., according to the first control information regardless of whether the second control information indicates one or two TCI states).

In some examples, the UE may receive control information (e.g., third control information from the base station 105-*b*) configuring a first group of CORESETs including a first CORESET associated with the first search space set and a second group of CORESETs including a second CORESET associated with the second search space set. The UE may determine (e.g., at 715) whether to link the search space sets based on the configuration of CORESETs. For example, if the two CORESETS associated with the two search space sets are in two different groups of CORESETs, then the UE may apply the rules described herein (e.g., may link or not link the search space sets based on a number of TCI states included in the second control information). If the two CORESETs, however, do not belong to the same group of CORESETs, then the UE may always assume search space set linking, or may not assume search space set linking (e.g., based on one or more rules, as described in greater detail with reference to FIG. 5).

In some examples, the UE 115-*b* may determine whether to link the search space sets according to the configuration information included in the first control information based on whether a first CORESET associated with the first search space set is the same as or different from a second CORESET associated with the second search space set. For example, if the two search space sets are associated with the same CORESET, then the UE may implement search space set linking according to the first control information (e.g., regardless of whether the second control information indicates one or two TCI states).

In some examples, the UE may receive control information (e.g., third control information from the base station 105-*b*) configuring a first group of CORESETs including a first CORESET associated with the first search space set and a second group of CORESETs including a second CORESET associated with the second search space set. The UE may determine (e.g., at 715) whether to link the search space sets based on the configuration of CORESETs. For example, if the two CORESETS associated with the two search space sets are in two different groups of CORESETs, then the UE may apply the rules described herein (e.g., may link or not link the search space sets based on a number of TCI states included in the second control information).

In some examples, the UE 115-*b* may receive configuration information of one or more CORESETs. If one or both CORESETs associated with the first and second search space sets, respectively, do not belong to any CORESET group (e.g., if one of the two CORESETs is a CORESET0 or is associated with non-UE-dedicated reception on a PDCCH), then the UE 115-*b* may assume linking between the search space sets (e.g., according to the first control information, regardless of whether the second control information indicates one or two TCI states).

Figure 8:
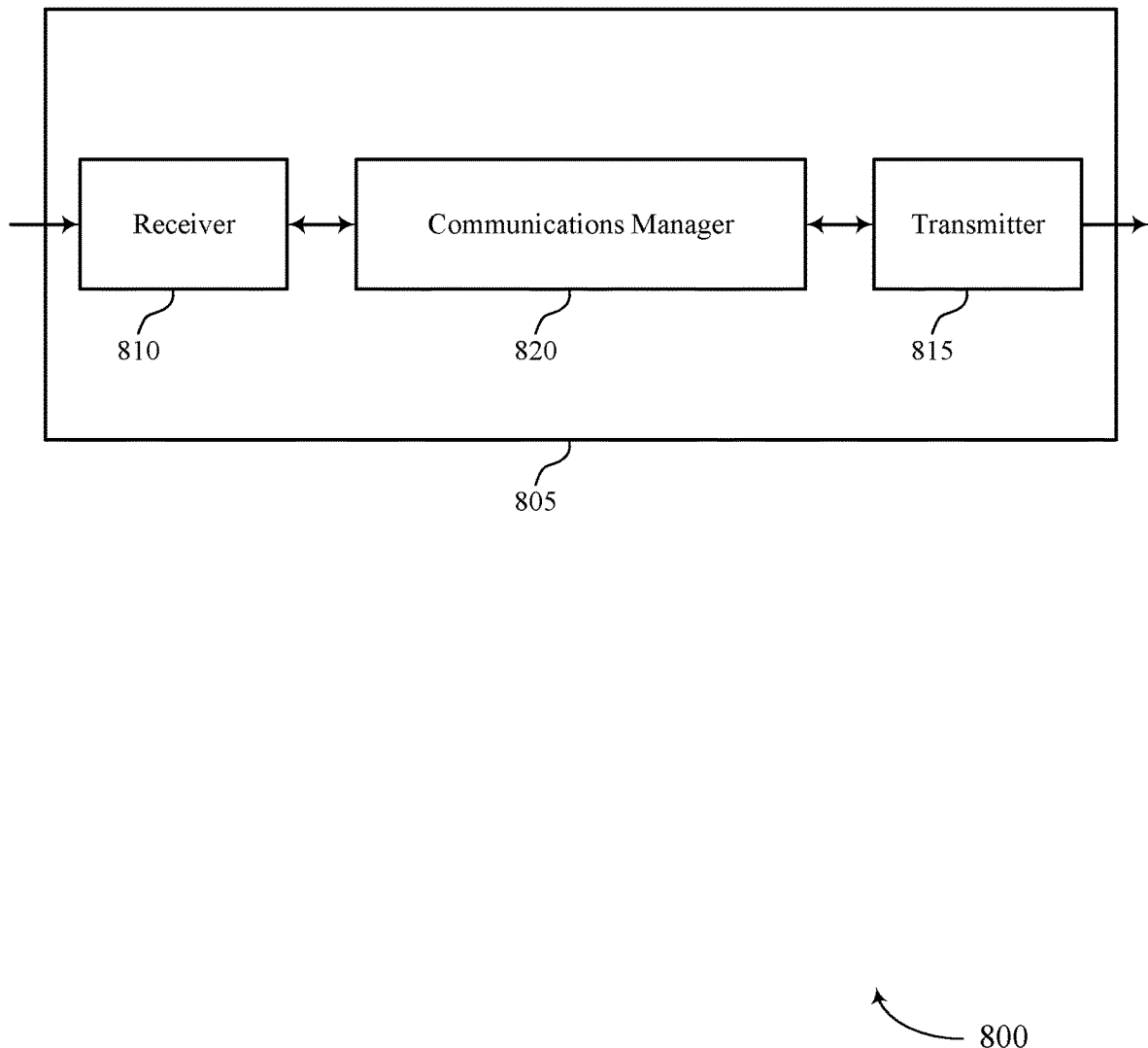
FIGS. 8 and 9 show block diagrams of devices that support search space set linking with unified beam configurations in accordance with aspects of the present disclosure.

FIG. 8 shows a block diagram 800 of a device 805 that supports search space set linking with unified beam configurations in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to search space set linking with unified beam configurations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to search space set linking with unified beam configurations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of search space set linking with unified beam configurations as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

For example, the communications manager 820 may be configured as or otherwise support a means for receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The communications manager 820 may be configured as or otherwise support a means for receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The communications manager 820 may be configured as or otherwise support a means for receiving, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for flexible linking of search space sets, resulting in more efficient use of available system resources, more efficient use of computational resources, reduced power expenditure, improved reliability of communications, and improved user experience.

Figure 9:
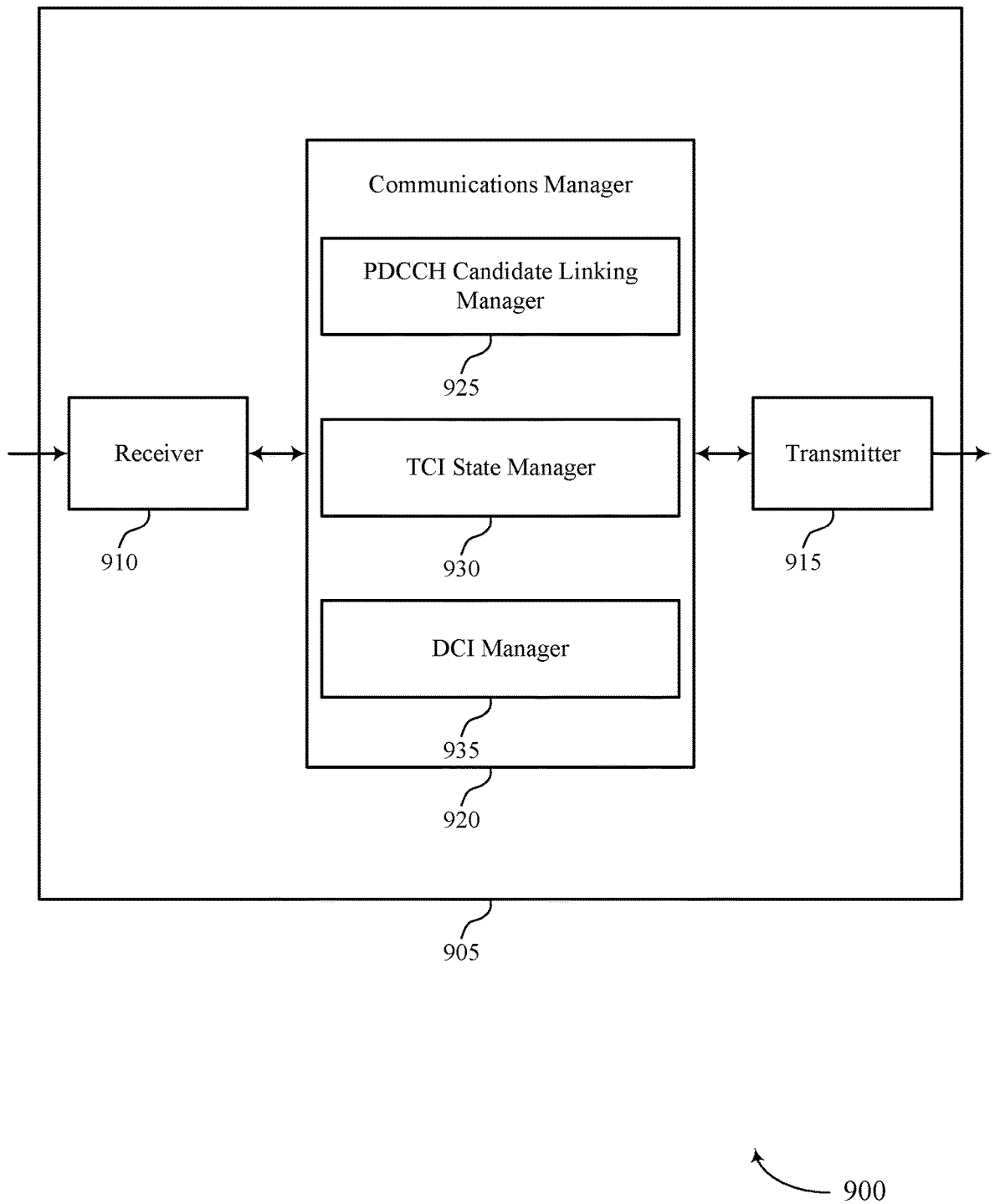

FIG. 9 shows a block diagram 900 of a device 905 that supports search space set linking with unified beam configurations in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to search space set linking with unified beam configurations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to search space set linking with unified beam configurations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of search space set linking with unified beam configurations as described herein. For example, the communications manager 920 may include a PDCCH candidate linking manager 925, a TCI state manager 930, a DCI manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The PDCCH candidate linking manager 925 may be configured as or otherwise support a means for receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The TCI state manager 930 may be configured as or otherwise support a means for receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The DCI manager 935 may be configured as or otherwise support a means for receiving, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

Figure 10:
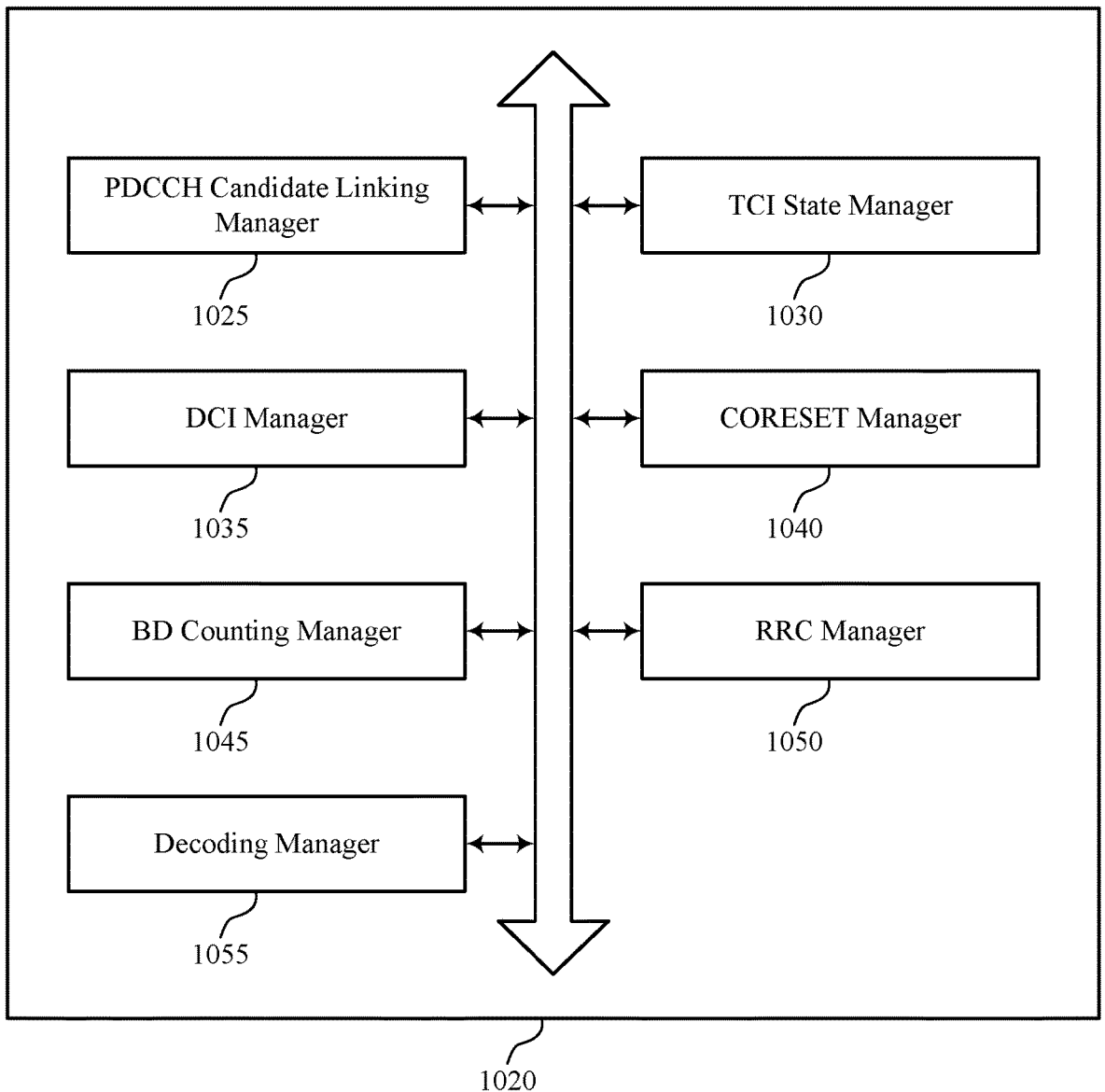
FIG. 10 shows a block diagram of a communications manager that supports search space set linking with unified beam configurations in accordance with aspects of the present disclosure.

FIG. 10 shows a block diagram 1000 of a communications manager 1020 that supports search space set linking with unified beam configurations in accordance with aspects of the present disclosure. The communications manager 1020 may be an example of aspects of a communications manager 820, a communications manager 920, or both, as described herein. The communications manager 1020, or various components thereof, may be an example of means for performing various aspects of search space set linking with unified beam configurations as described herein. For example, the communications manager 1020 may include a PDCCH candidate linking manager 1025, a TCI state manager 1030, a DCI manager 1035, a CORESET manager 1040, a BD counting manager 1045, an RRC manager 1050, a decoding manager 1055, or any combination thereof. Each of these components may communicate, directly or indirectly, with one another (e.g., via one or more buses).

The PDCCH candidate linking manager 1025 may be configured as or otherwise support a means for receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The TCI state manager 1030 may be configured as or otherwise support a means for receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The DCI manager 1035 may be configured as or otherwise support a means for receiving, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

In some examples, the PDCCH candidate linking manager 1025 may be configured as or otherwise support a means for refraining from linking the first group of downlink control channel candidates and the second group of downlink control channel candidates based on the second control information that includes the information indicative of one TCI state.

In some examples, the BD counting manager 1045 may be configured as or otherwise support a means for counting a first downlink control channel candidate of the first group of downlink control channel candidates toward a blind decoding limit associated with a first slot. In some examples, the BD counting manager 1045 may be configured as or otherwise support a means for counting a second downlink control channel candidate of the second group of downlink control channel candidates toward the blind decoding limit associated with the first slot based on the second control information that includes the information indicative of one TCI state, the first downlink control channel candidate and the second downlink control channel candidate being located in the first slot.

In some examples, to support receiving the first downlink control information message, the DCI manager 1035 may be configured as or otherwise support a means for receiving, using the one TCI state, the first downlink control information message in one of the first group of downlink control channel candidates or the second group of downlink control channel candidates.

In some examples, the RRC manager 1050 may be configured as or otherwise support a means for receiving, from the second network node, a radio resource control message enabling the first network node to refrain from linking the first group of downlink control channel candidates and the second group of downlink control channel candidates based on the second control information that includes the information indicative of one TCI state, the refraining based on receiving the radio resource control message.

In some examples, the DCI manager 1035 may be configured as or otherwise support a means for receiving, using the one TCI state, a second downlink control information message in the second group of downlink control channel candidates in the second MO associated with the second search space set. In some examples, the decoding manager 1055 may be configured as or otherwise support a means for decoding the first downlink control information message independently from the second downlink control information message.

In some examples, the one TCI state is associated with a first coreset associated with the first search space set and a second coreset associated with the second search space set.

In some examples, the PDCCH candidate linking manager 1025 may be configured as or otherwise support a means for linking the first group of downlink control channel candidates and the second group of downlink control channel candidates based on the second control information that includes the information indicative of two TCI states.

In some examples, the BD counting manager 1045 may be configured as or otherwise support a means for counting a first downlink control channel candidate of the first group of downlink control channel candidates toward a blind decoding limit associated with a first slot. In some examples, the BD counting manager 1045 may be configured as or otherwise support a means for counting a second downlink control channel candidate of the second group of downlink control channel candidates toward the blind decoding limit associated with the first slot. In some examples, the BD counting manager 1045 may be configured as or otherwise support a means for counting a combination of the first downlink control channel candidate and the second downlink control channel candidate toward the blind decoding limit associated with the first slot based on the second control information that includes the information indicative of two TCI states, first downlink control channel candidate and the second downlink control channel candidate being located in the first slot.

In some examples, the decoding manager 1055 may be configured as or otherwise support a means for decoding, based on the first control information and the second control information that includes the information indicative of two TCI states, the first downlink control information message based on a reference downlink control channel candidate of the first group of downlink control channel candidates.

In some examples, a first TCI state of the two TCI states is associated with a first coreset associated with the first search space set. In some examples, a second TCI state of the two TCI states is associated with a second coreset associated with the second search space set.

In some examples, the CORESET manager 1040 may be configured as or otherwise support a means for receiving, from the second network node, third control information that includes information indicative of a configuration of a first group of control resource sets including a first control resource set associated with the first search space set and a second group of control resource sets including a second control resource set associated with the second search space set. In some examples, the CORESET manager 1040 may be configured as or otherwise support a means for determining whether the first network node is to link the first group of downlink control channel candidates and the second group of downlink control channel candidates based on the third control information, where receiving the second control information is based on the determination.

In some examples, the PDCCH candidate linking manager 1025 may be configured as or otherwise support a means for determining whether the first network node is to link the first group of downlink control channel candidates and the second group of downlink control channel candidates based on whether a first control resource set associated with the first search space set is the same as a second control resource set associated with the second search space set.

In some examples, the CORESET manager 1040 may be configured as or otherwise support a means for receiving, from the second network node, third control information that includes information indicative of a configuration of one or more groups of control resource sets. In some examples, the CORESET manager 1040 may be configured as or otherwise support a means for receiving, from the second network node, fourth control information that includes information indicative of a configuration of a first control resource set associated with the first search space set, a second control resource set associated with the second search space set, or both, where the first control resource set, the second control resource set, or both, are distinct from the one or more groups of control resource sets. In some examples, the PDCCH candidate linking manager 1025 may be configured as or otherwise support a means for determining whether the first network node is to link the first group of downlink control channel candidates and the second group of downlink control channel candidates based on the fourth control information.

Figure 11:
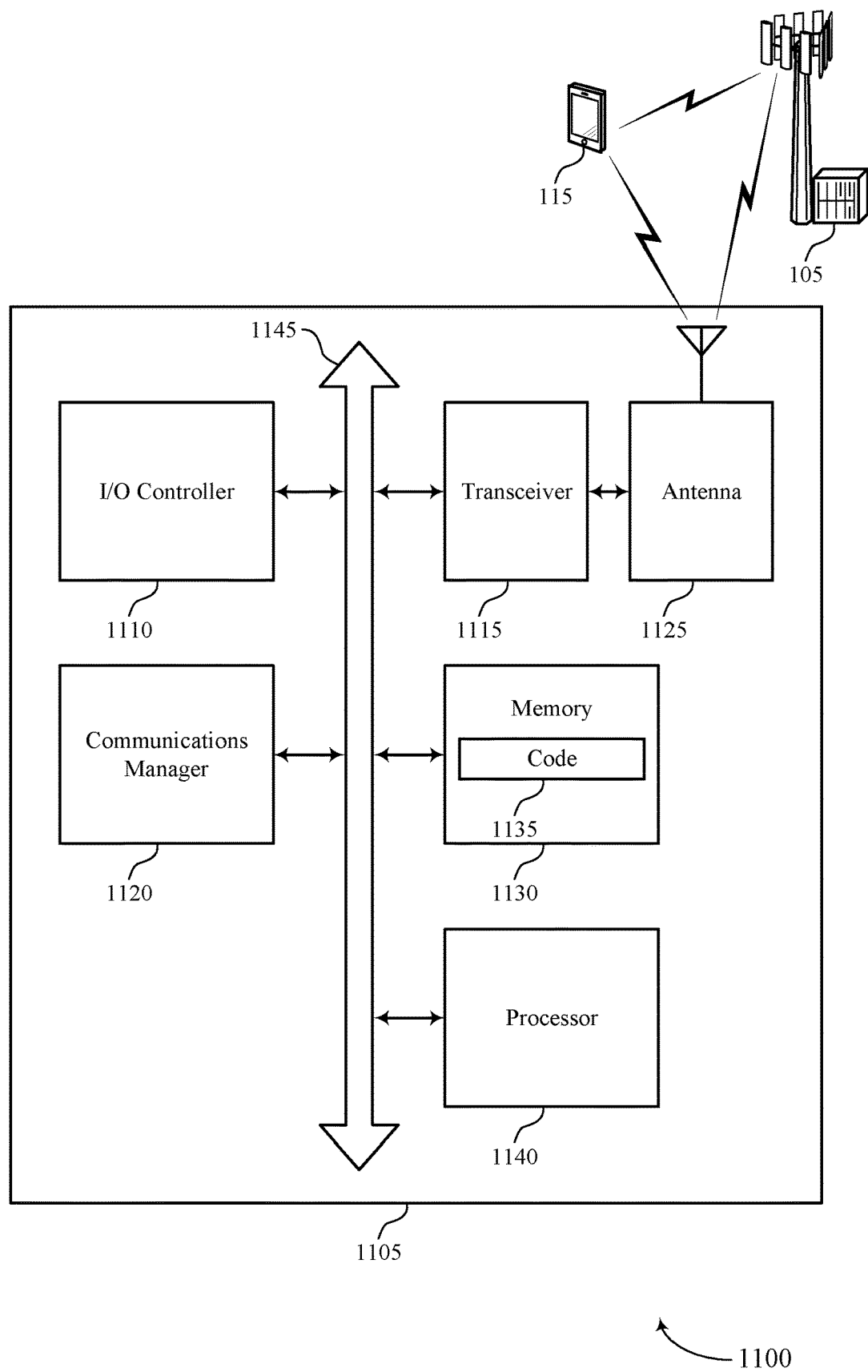
FIG. 11 shows a diagram of a system including a device that supports search space set linking with unified beam configurations in accordance with aspects of the present disclosure.

FIG. 11 shows a diagram of a system 1100 including a device 1105 that supports search space set linking with unified beam configurations in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting search space set linking with unified beam configurations). For example, the device 1105 or a component of the device 1105 may include a processor 1140 and memory 1130 coupled with or to the processor 1140, the processor 1140 and memory 1130 configured to perform various functions described herein.

For example, the communications manager 1120 may be configured as or otherwise support a means for receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The communications manager 1120 may be configured as or otherwise support a means for receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The communications manager 1120 may be configured as or otherwise support a means for receiving, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

By including or configuring the communications manager 1120 in accordance with examples as described herein, the device 1105 may support techniques for flexible linking of search space sets, resulting in more efficient use of available system resources, more efficient use of computational resources, reduced power expenditure, improved reliability of communications, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of search space set linking with unified beam configurations as described herein, or the processor 1140 and the memory 1130 may be otherwise configured to perform or support such operations.

Figure 12:
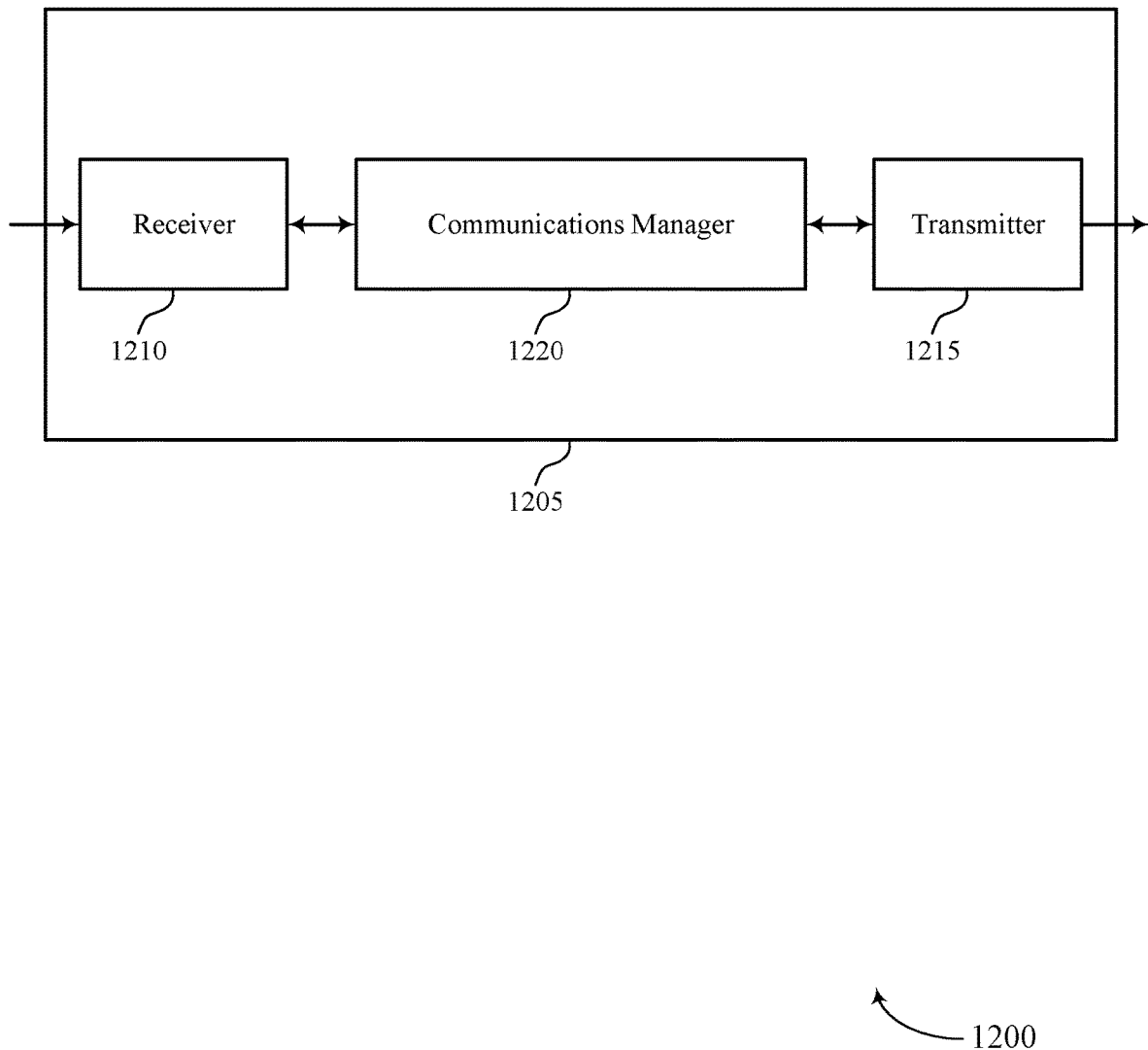
FIGS. 12 and 13 show block diagrams of devices that support search space set linking with unified beam configurations in accordance with aspects of the present disclosure.

FIG. 12 shows a block diagram 1200 of a device 1205 that supports search space set linking with unified beam configurations in accordance with aspects of the present disclosure. The device 1205 may be an example of aspects of a Network Entity as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to search space set linking with unified beam configurations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to search space set linking with unified beam configurations). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of search space set linking with unified beam configurations as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

For example, the communications manager 1220 may be configured as or otherwise support a means for outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The communications manager 1220 may be configured as or otherwise support a means for outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The communications manager 1220 may be configured as or otherwise support a means for outputting, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for flexible linking of search space sets, resulting in more efficient use of available system resources, more efficient use of computational resources, improved reliability of communications, and improved user experience.

Figure 13:
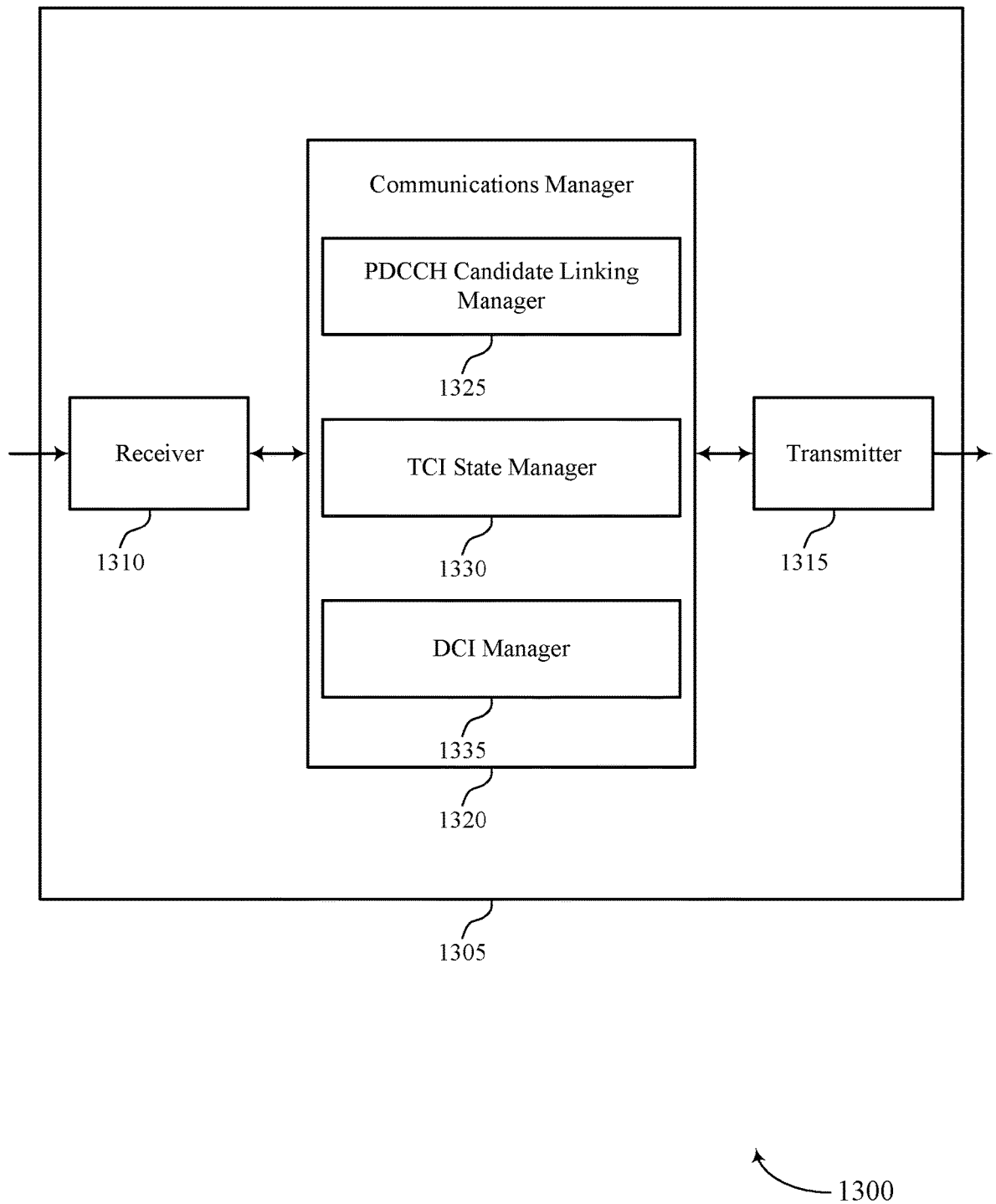

FIG. 13 shows a block diagram 1300 of a device 1305 that supports search space set linking with unified beam configurations in accordance with aspects of the present disclosure. The device 1305 may be an example of aspects of a device 1205 or a Network Entity 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to search space set linking with unified beam configurations). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to search space set linking with unified beam configurations). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of search space set linking with unified beam configurations as described herein. For example, the communications manager 1320 may include a PDCCH candidate linking manager 1325, a TCI state manager 1330, a DCI manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The PDCCH candidate linking manager 1325 may be configured as or otherwise support a means for outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The TCI state manager 1330 may be configured as or otherwise support a means for outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The DCI manager 1335 may be configured as or otherwise support a means for outputting, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

Figure 14:
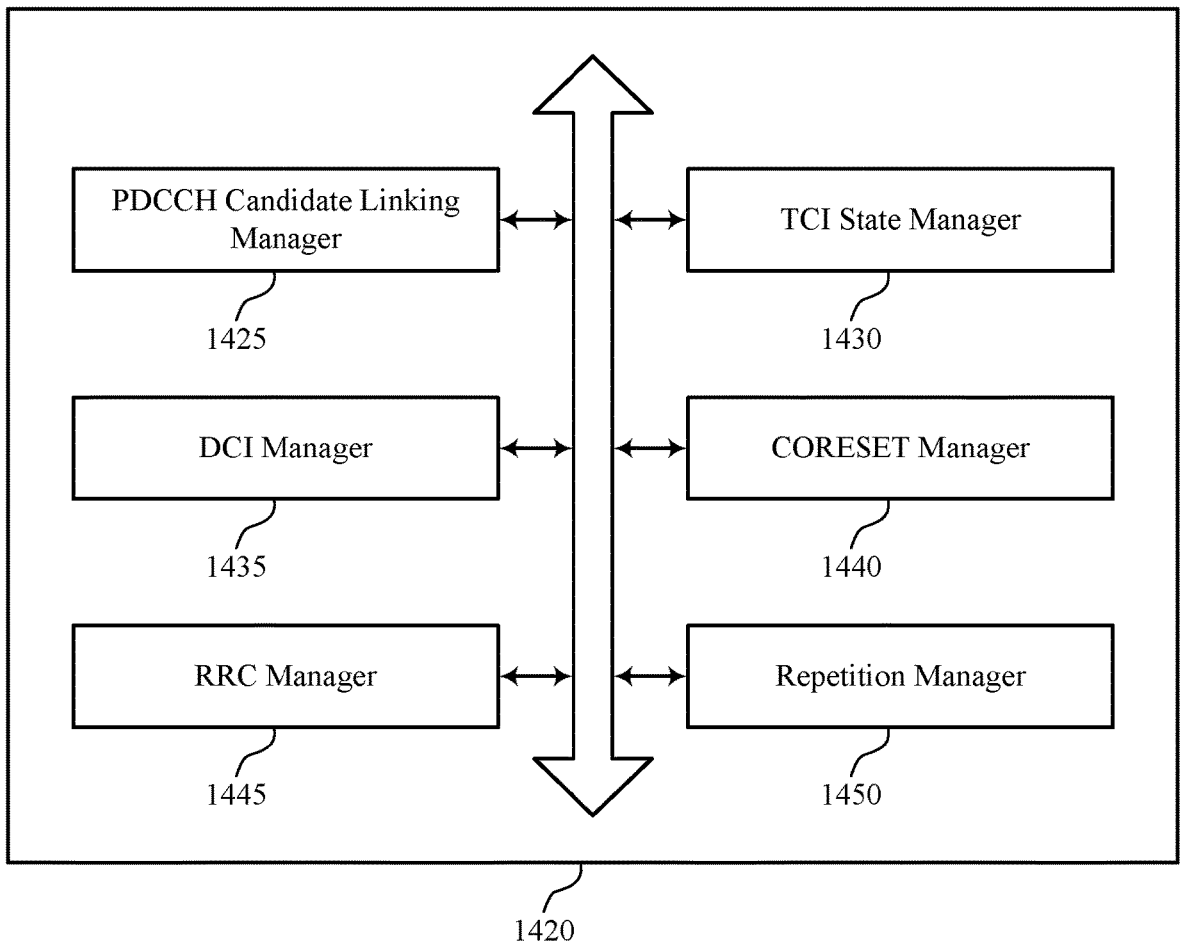
FIG. 14 shows a block diagram of a communications manager that supports search space set linking with unified beam configurations in accordance with aspects of the present disclosure.

FIG. 14 shows a block diagram 1400 of a communications manager 1420 that supports search space set linking with unified beam configurations in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of search space set linking with unified beam configurations as described herein. For example, the communications manager 1420 may include a PDCCH candidate linking manager 1425, a TCI state manager 1430, a DCI manager 1435, a CORESET manager 1440, an RRC manager 1445, a repetition manager 1450, or any combination thereof. Each of these components may communicate, directly or indirectly, with one another (e.g., via one or more buses).

The PDCCH candidate linking manager 1425 may be configured as or otherwise support a means for outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The TCI state manager 1430 may be configured as or otherwise support a means for outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The DCI manager 1435 may be configured as or otherwise support a means for outputting, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

In some examples, the PDCCH candidate linking manager 1425 may be configured as or otherwise support a means for determining, based on outputting the second control information that includes information indicative of one TCI state, that the first group of downlink control channel candidates are independent from the second group of downlink control channel candidates.

In some examples, the RRC manager 1445 may be configured as or otherwise support a means for outputting, to the second network node, a radio resource control message enabling the second network node to refrain from linking the first group of downlink control channel candidates and the second group of downlink control channel candidates based on the second control information that includes the information indicative of one TCI state, the determination based on outputting the radio resource control message.

In some examples, the DCI manager 1435 may be configured as or otherwise support a means for outputting, according to the one TCI state, a second downlink control information message in the second group of downlink control channel candidates in the second MO associated with the second search space set, the first downlink control information message independent from the second downlink control information message.

In some examples, the PDCCH candidate linking manager 1425 may be configured as or otherwise support a means for determining, based on outputting the second control information that includes the information indicative of two TCI states, that the first group of downlink control channel candidates are linked with the second group of downlink control channel candidates according to the first control information.

In some examples, to support outputting the first downlink control information message, the repetition manager 1450 may be configured as or otherwise support a means for outputting a first repetition of the first downlink control information message according to a first TCI state of the two TCI states via a first coreset associated with the first search space set. In some examples, to support outputting the first downlink control information message, the repetition manager 1450 may be configured as or otherwise support a means for outputting a second repetition of the first downlink control information message according to a second TCI state of the two TCI states via a second coreset associated with the second search space set, the outputting the first repetition, the second repetition, or a combination thereof, based at last in part on a reference downlink control channel candidate of the first group of downlink control channel candidates.

In some examples, the CORESET manager 1440 may be configured as or otherwise support a means for outputting, to the second network node, third control information that includes information indicative of a configuration of a first group of control resource sets including a first control resource set associated with the first search space set and a second group of control resource sets including a second control resource set associated with the second search space set. In some examples, the PDCCH candidate linking manager 1425 may be configured as or otherwise support a means for determining whether the second network node is to link the first group of downlink control channel candidates and the second group of downlink control channel candidates based on the third control information, where outputting the first downlink control information message is based on the determination.

In some examples, the CORESET manager 1440 may be configured as or otherwise support a means for determining whether the second network node is to link the first group of downlink control channel candidates and the second group of downlink control channel candidates based on whether a first control resource set associated with the first search space set is the same as a second control resource set associated with the second search space set.

In some examples, the CORESET manager 1440 may be configured as or otherwise support a means for outputting, to the second network node, third control information that includes information indicative of a configuration of one or more groups of control resource sets. In some examples, the CORESET manager 1440 may be configured as or otherwise support a means for outputting, to the second network node, fourth control information that includes information indicative of a configuration of a first control resource set associated with the first search space set, a second control resource set associated with the second search space set, or both, where the first control resource set, the second control resource set, or both, are distinct from the one or more groups of control resource sets. In some examples, the PDCCH candidate linking manager 1425 may be configured as or otherwise support a means for determining whether the second network node is to link the first group of downlink control channel candidates and the second group of downlink control channel candidates based on the fourth control information.

Figure 15:
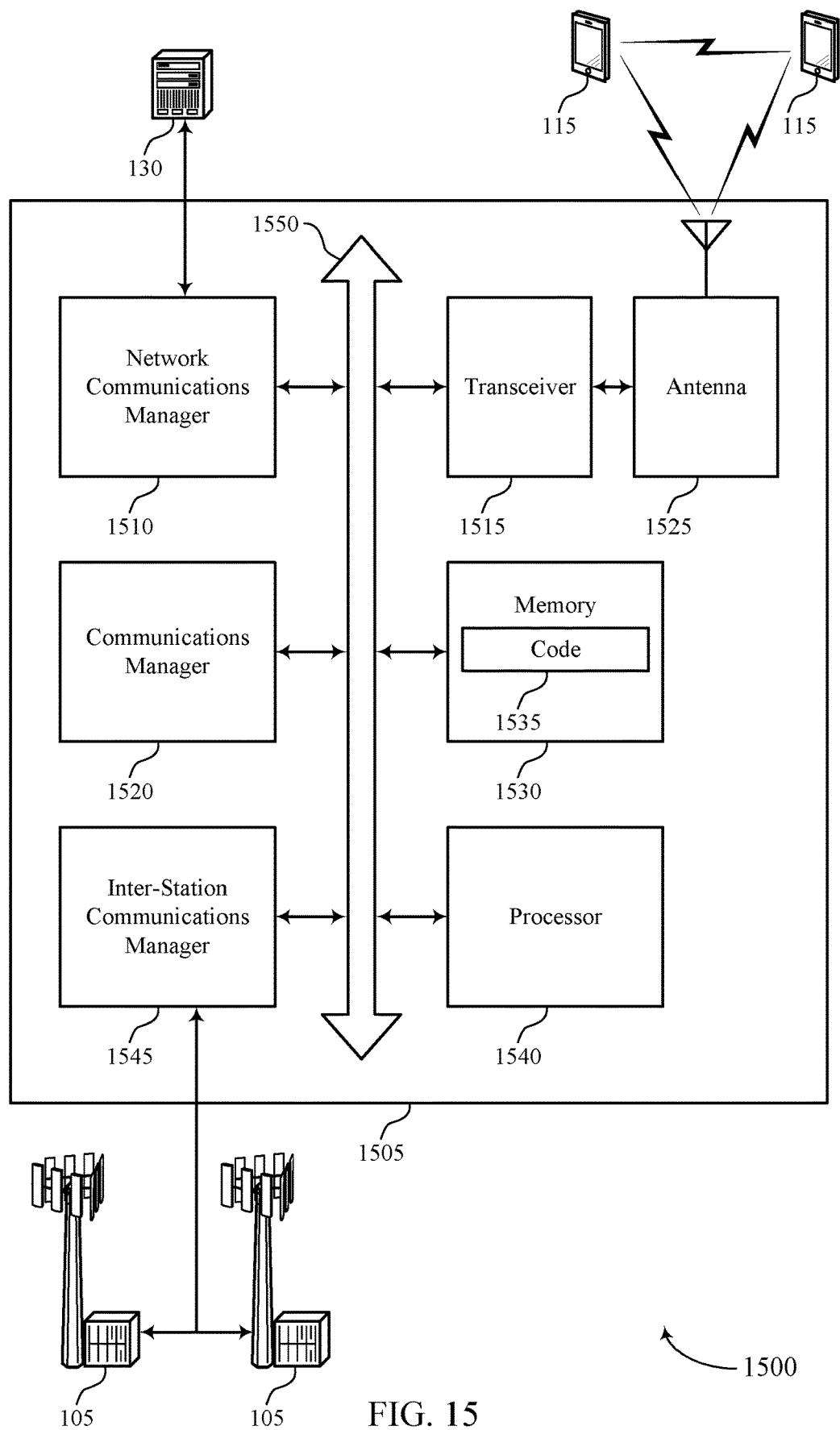
FIG. 15 shows a diagram of a system including a device that supports search space set linking with unified beam configurations in accordance with aspects of the present disclosure.

FIG. 15 shows a diagram of a system 1500 including a device 1505 that supports search space set linking with unified beam configurations in accordance with aspects of the present disclosure. The device 1505 may be an example of or include the components of a device 1205, a device 1305, or a Network Entity as described herein. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting search space set linking with unified beam configurations). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

For example, the communications manager 1520 may be configured as or otherwise support a means for outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The communications manager 1520 may be configured as or otherwise support a means for outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The communications manager 1520 may be configured as or otherwise support a means for outputting, using the one or more TCI states, a first downlink control information message via the first group of downlink control channel candidates in a first MO associated with the first search space set, the second group of downlink control channel candidates in a second MO associated with the second search space set, or a combination thereof, based on a number of TCI states of the one or more TCI states.

By including or configuring the communications manager 1520 in accordance with examples as described herein, the device 1505 may support techniques for flexible linking of search space sets, resulting in more efficient use of available system resources, more efficient use of computational resources, improved reliability of communications, and improved user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of search space set linking with unified beam configurations as described herein, or the processor 1540 and the memory 1530 may be otherwise configured to perform or support such operations.

Figure 16:
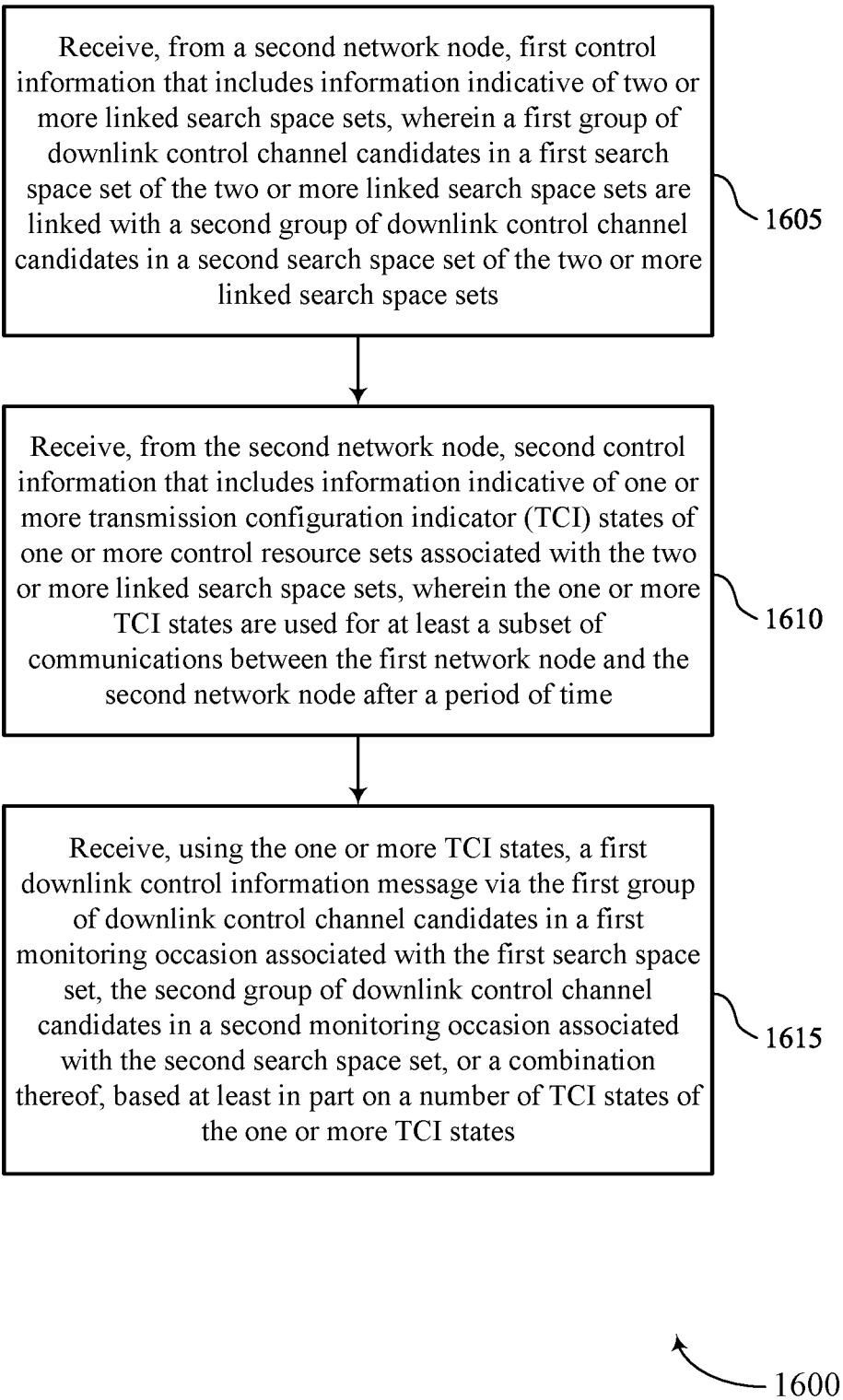
FIGS. 16 through 19 show flowcharts illustrating methods that support search space set linking with unified beam configurations in accordance with aspects of the present disclosure.

FIG. 16 shows a flowchart illustrating a method 1600 that supports search space set linking with unified beam configurations in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The operations of 1605 may be performed in accordance with examples as disclosed herein. In some examples, aspects of the operations of 1605 may be performed by a PDCCH candidate linking manager 1025 as described with reference to FIG. 10.

At 1610, the method may include receiving, from the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The operations of 1610 may be performed in accordance with examples as disclosed herein. In some examples, aspects of the operations of 1610 may be performed by a TCI state manager 1030 as described with reference to FIG. 10.

At 1615, the method may include receiving, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states. The operations of 1615 may be performed in accordance with examples as disclosed herein. In some examples, aspects of the operations of 1615 may be performed by a DCI manager 1035 as described with reference to FIG. 10.

Figure 17:
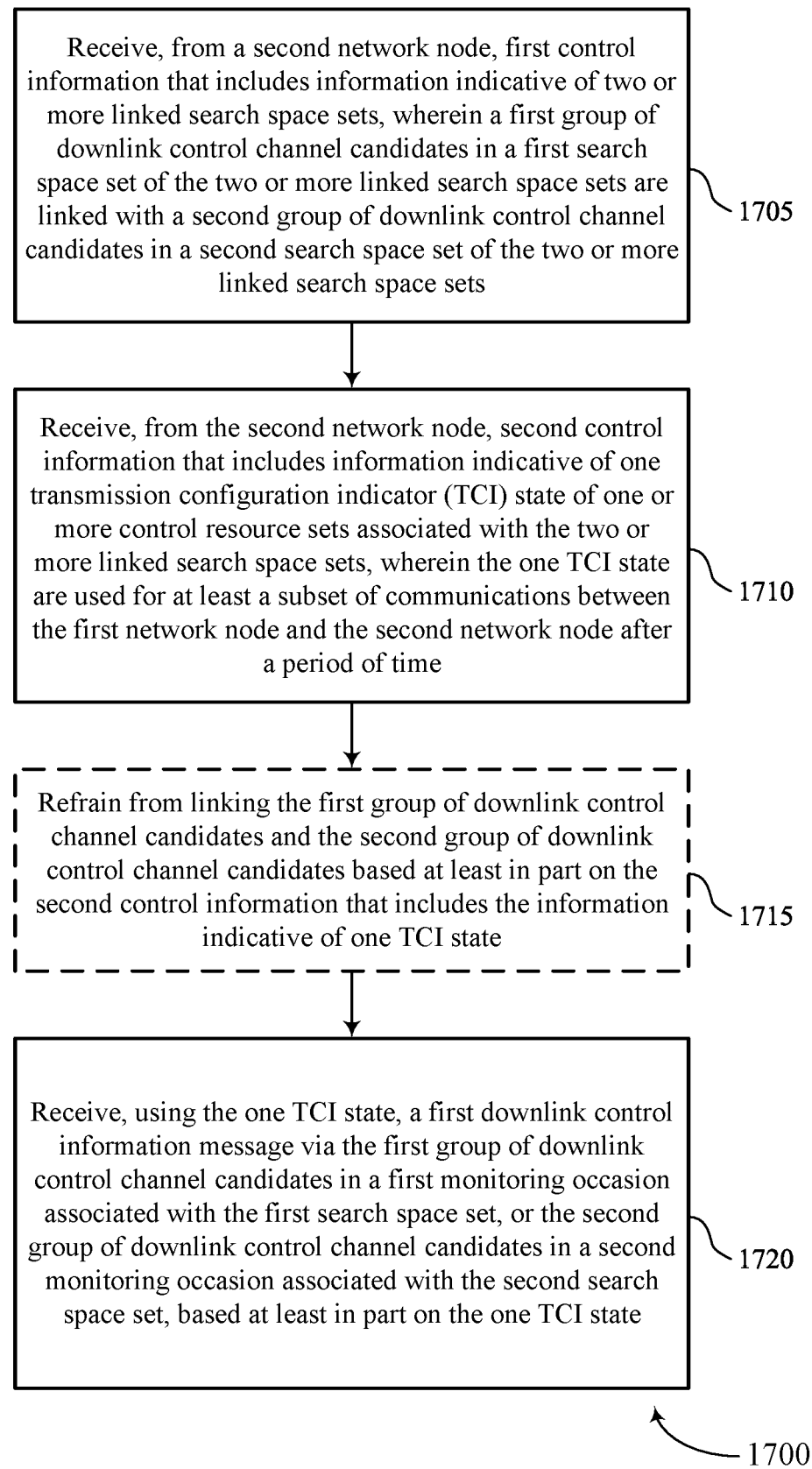

FIG. 17 shows a flowchart illustrating a method 1700 that supports search space set linking with unified beam configurations in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The operations of 1705 may be performed in accordance with examples as disclosed herein. In some examples, aspects of the operations of 1705 may be performed by a PDCCH candidate linking manager 1025 as described with reference to FIG. 10.

At 1710, the method may include receiving, from the second network node, second control information that includes information indicative of one transmission configuration indicator (TCI) state of one or more control resource sets associated with the two or more linked search space sets, wherein the one TCI state are used for at least a subset of communications between the first network node and the second network node after a period of time. The operations of 1710 may be performed in accordance with examples as disclosed herein. In some examples, aspects of the operations of 1710 may be performed by a TCI state manager 1030 as described with reference to FIG. 10.

At 1715, the method may include refraining from linking the first group of downlink control channel candidates and the second group of downlink control channel candidates based at least in part on the second control information that includes the information indicative of one TCI state. The operations of 1715 may be performed in accordance with examples as disclosed herein. In some examples, aspects of the operations of 1715 may be performed by a PDCCH candidate linking manager 1025 as described with reference to FIG. 10.

At 1720, the method may include receiving, using the one TCI state, a first downlink control information message via the first group of downlink control channel candidates in a first monitoring occasion associated with the first search space set, or the second group of downlink control channel candidates in a second monitoring occasion associated with the second search space set, based at least in part on the one TCI state. The operations of 1720 may be performed in accordance with examples as disclosed herein. In some examples, aspects of the operations of 1720 may be performed by a DCI manager 1035 as described with reference to FIG. 10.

Figure 18:
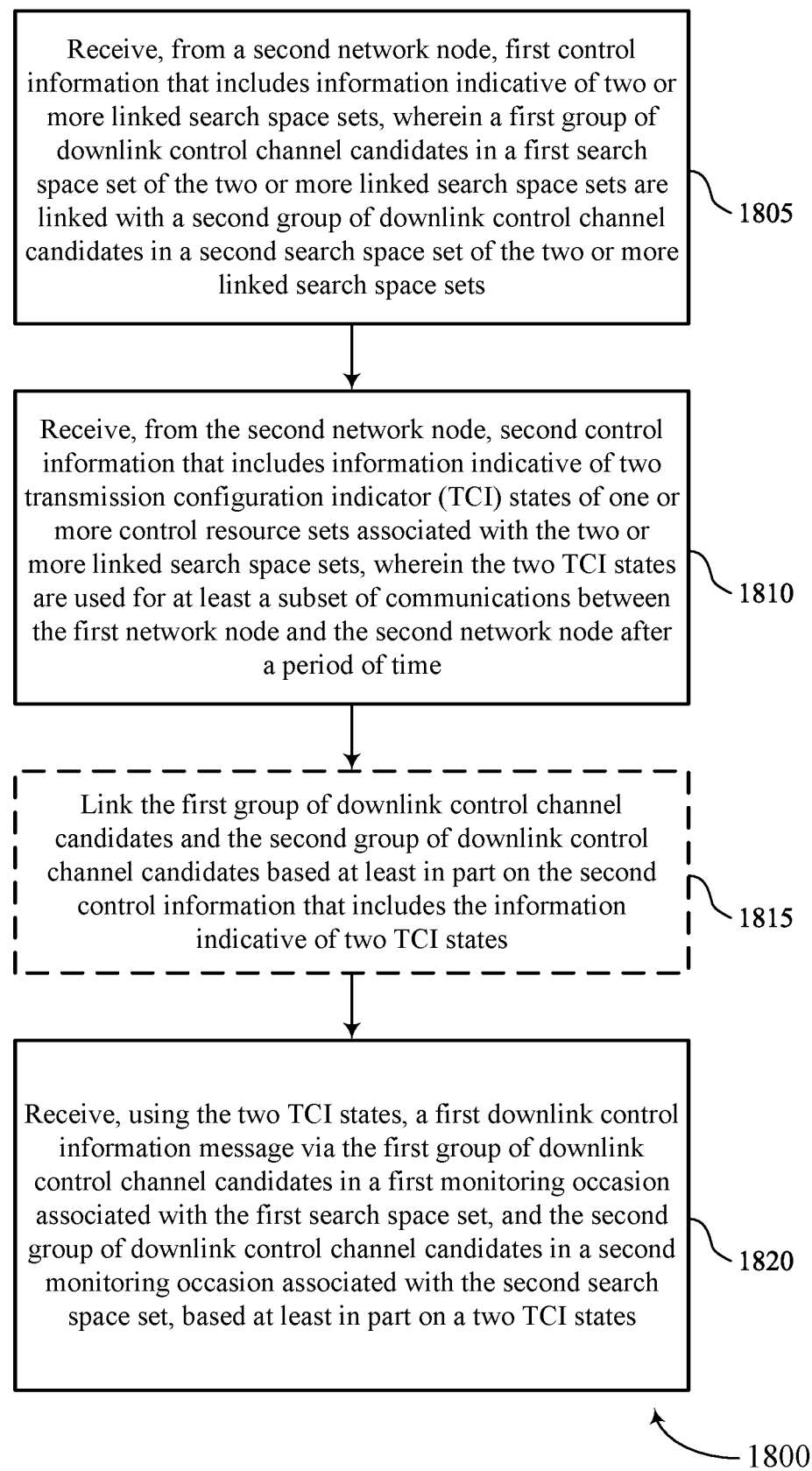

FIG. 18 shows a flowchart illustrating a method 1800 that supports search space set linking with unified beam configurations in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The operations of 1805 may be performed in accordance with examples as disclosed herein. In some examples, aspects of the operations of 1805 may be performed by a PDCCH candidate linking manager 1025 as described with reference to FIG. 10.

At 1810, the method may include receiving, from the second network node, second control information that includes information indicative of two transmission configuration indicator (TCI) states of one or more control resource sets associated with the two or more linked search space sets, wherein the two TCI states are used for at least a subset of communications between the first network node and the second network node after a period of time. The operations of 1810 may be performed in accordance with examples as disclosed herein. In some examples, aspects of the operations of 1810 may be performed by a TCI state manager 1030 as described with reference to FIG. 10.

At 1815, the method may include linking the first group of downlink control channel candidates and the second group of downlink control channel candidates based at least in part on the second control information that includes the information indicative of two TCI states. The operations of 1815 may be performed in accordance with examples as disclosed herein. In some examples, aspects of the operations of 1815 may be performed by a PDCCH candidate linking manager 1025 as described with reference to FIG. 10.

At 1820, the method may include receiving, using the two TCI states, a first downlink control information message via the first group of downlink control channel candidates in a first monitoring occasion associated with the first search space set, and the second group of downlink control channel candidates in a second monitoring occasion associated with the second search space set, based at least in part on a two TCI states. The operations of 1820 may be performed in accordance with examples as disclosed herein. In some examples, aspects of the operations of 1820 may be performed by a DCI manager 1035 as described with reference to FIG. 10.

Figure 19:
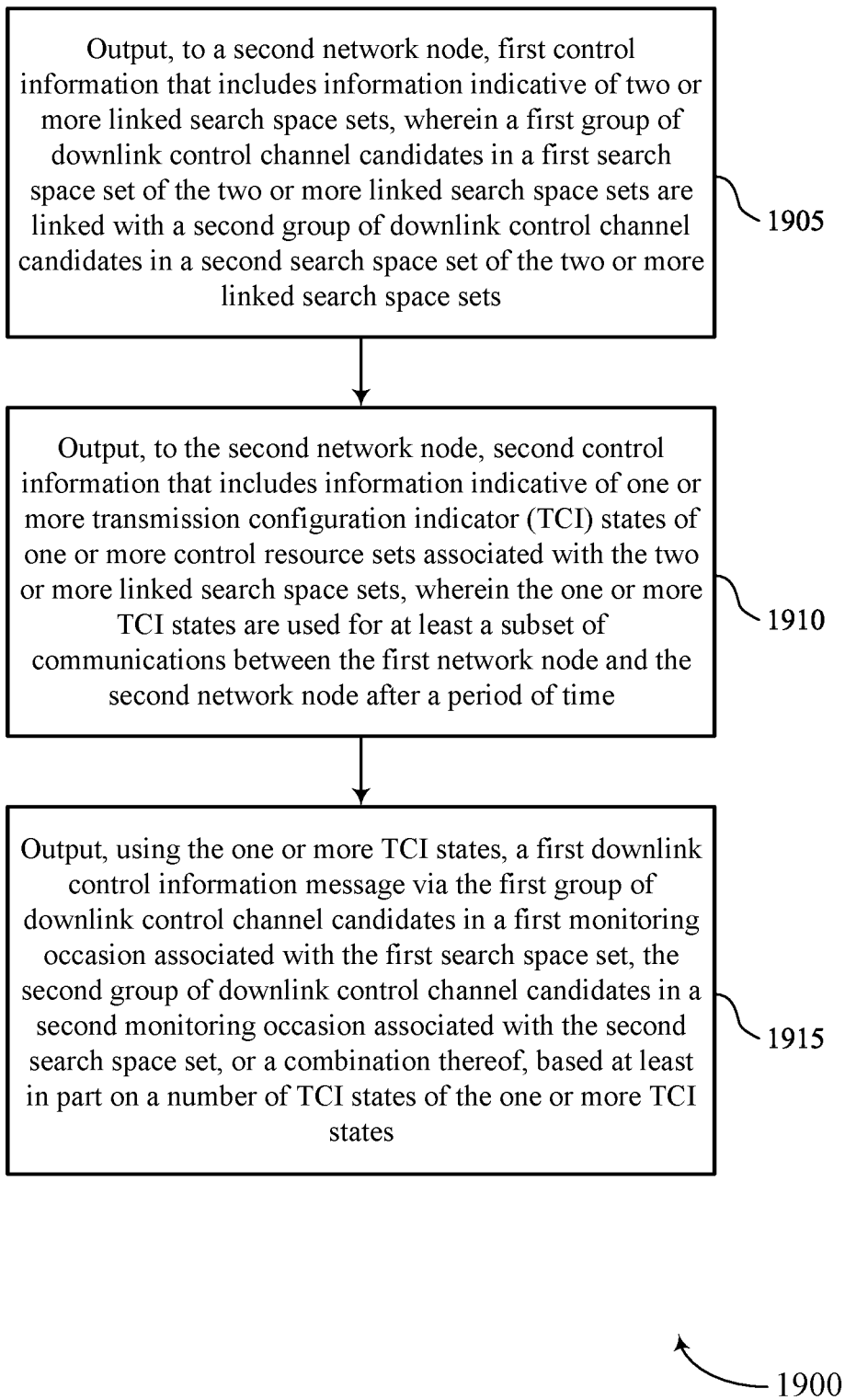

FIG. 19 shows a flowchart illustrating a method 1900 that supports search space set linking with unified beam configurations in accordance with aspects of the present disclosure. The operations of the method 1900 may be implemented by a Network Entity or its components as described herein. For example, the operations of the method 1900 may be performed by a Network Entity as described with reference to FIGS. 1 through 7 and 12 through 15. In some examples, a Network Entity may execute a set of instructions to control the functional elements of the Network Entity to perform the described functions. Additionally or alternatively, the Network Entity may perform aspects of the described functions using special-purpose hardware.

At 1905, the method may include outputting, to a second network node, first control information that includes information indicative of two or more linked search space sets, where a first group of downlink control channel candidates in a first search space set of the two or more linked search space sets are linked with a second group of downlink control channel candidates in a second search space set of the two or more linked search space sets. The operations of 1905 may be performed in accordance with examples as disclosed herein. In some examples, aspects of the operations of 1905 may be performed by a PDCCH candidate linking manager 1425 as described with reference to FIG. 14.

At 1910, the method may include outputting, to the second network node, second control information that includes information indicative of one or more transmission configuration indicator (TCI) states of one or more control resource sets associated with the two or more linked search space sets, where the one or more TCI states are used for at least a subset of communications between the first network node and the second network node after a period of time. The operations of 1910 may be performed in accordance with examples as disclosed herein. In some examples, aspects of the operations of 1910 may be performed by a TCI state manager 1430 as described with reference to FIG. 14.

At 1915, the method may include outputting, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based on a number of TCI states of the one or more TCI states. The operations of 1915 may be performed in accordance with examples as disclosed herein. In some examples, aspects of the operations of 1915 may be performed by a DCI manager 1435 as described with reference to FIG. 14.

The following provides an overview of aspects of the present disclosure:

Aspect 1: A method of wireless communications performed by a first network node, comprising: receiving, from a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets; receiving, from the second network node, second control information that includes information indicative of one or more transmission configuration indicator (TCI) states of one or more control resource sets associated with the two or more linked search space sets, wherein the one or more TCI states are used for at least a subset of communications between the first network node and the second network node after a period of time; and receiving, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based at least in part on a number of TCI states of the one or more TCI states.

Aspect 2: The method of aspect 1, further comprising: refraining from linking the first group of downlink control channel candidates and the second group of downlink control channel candidates based at least in part on the second control information that includes the information indicative of one TCI state.

Aspect 3: The method of aspect 2, further comprising: counting a first downlink control channel candidate of the first group of downlink control channel candidates toward a blind decoding limit associated with a first slot; and counting a second downlink control channel candidate of the second group of downlink control channel candidates toward the blind decoding limit associated with the first slot based at least in part on the second control information that includes the information indicative of one TCI state, the first downlink control channel candidate and the second downlink control channel candidate being located in the first slot.

Aspect 4: The method of any of aspects 2 through 3, wherein receiving the first downlink control information message comprises: receiving, using the one TCI state, the first downlink control information message in one of the first group of downlink control channel candidates or the second group of downlink control channel candidates.

Aspect 5: The method of any of aspects 2 through 4, further comprising: receiving, from the second network node, a radio resource control message enabling the first network node to refrain from linking the first group of downlink control channel candidates and the second group of downlink control channel candidates based at least in part on the second control information that includes the information indicative of one TCI state, the refraining based at least in part on receiving the radio resource control message.

Aspect 6: The method of any of aspects 2 through 5, further comprising: receiving, using the one TCI state, a second downlink control information message in the second group of downlink control channel candidates in the second monitoring occasion associated with the second search space set; decoding the first downlink control information message independently from the second downlink control information message.

Aspect 7: The method of any of aspects 2 through 6, wherein the one TCI state is associated with a first coreset associated with the first search space set and a second coreset associated with the second search space set.

Aspect 8: The method of any of aspects 1 through 7, further comprising: linking the first group of downlink control channel candidates and the second group of downlink control channel candidates based at least in part on the second control information that includes the information indicative of two TCI states.

Aspect 9: The method of aspect 8, further comprising: counting a first downlink control channel candidate of the first group of downlink control channel candidates toward a blind decoding limit associated with a first slot; counting a second downlink control channel candidate of the second group of downlink control channel candidates toward the blind decoding limit associated with the first slot; and counting a combination of the first downlink control channel candidate and the second downlink control channel candidate toward the blind decoding limit associated with the first slot based at least in part on the second control information that includes the information indicative of two TCI states, first downlink control channel candidate and the second downlink control channel candidate being located in the first slot.

Aspect 10: The method of any of aspects 8 through 9, further comprising: decoding, based at least in part on the first control information and the second control information that includes the information indicative of two TCI states, the first downlink control information message based on a reference downlink control channel candidate of the first group of downlink control channel candidates.

Aspect 11: The method of any of aspects 8 through 10, wherein a first TCI state of the two TCI states is associated with a first coreset associated with the first search space set; and a second TCI state of the two TCI states is associated with a second coreset associated with the second search space set.

Aspect 12: The method of any of aspects 1 through 11, further comprising: receiving, from the second network node, third control information that includes information indicative of a configuration of a first group of control resource sets comprising a first control resource set associated with the first search space set and a second group of control resource sets comprising a second control resource set associated with the second search space set; and determining whether the first network node is to link the first group of downlink control channel candidates and the second group of downlink control channel candidates based at least in part on the third control information, wherein receiving the second control information is based at least in part on the determination.

Aspect 13: The method of any of aspects 1 through 12, further comprising: determining whether the first network node is to link the first group of downlink control channel candidates and the second group of downlink control channel candidates based at least in part on whether a first control resource set associated with the first search space set is the same as a second control resource set associated with the second search space set.

Aspect 14: The method of any of aspects 1 through 13, further comprising: receiving, from the second network node, third control information that includes information indicative of a configuration of one or more groups of control resource sets; receiving, from the second network node, fourth control information that includes information indicative of a configuration of a first control resource set associated with the first search space set, a second control resource set associated with the second search space set, or both, wherein the first control resource set, the second control resource set, or both, are distinct from the one or more groups of control resource sets; and determining whether the first network node is to link the first group of downlink control channel candidates and the second group of downlink control channel candidates based at least in part on the fourth control information.

Aspect 15: A method of wireless communications performed by a first network node, comprising: outputting, to a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets; outputting, to the second network node, second control information that includes information indicative of one or more transmission configuration indicator (TCI) states of one or more control resource sets associated with the two or more linked search space sets, wherein the one or more TCI states are used for at least a subset of communications between the first network node and the second network node after a period of time; and outputting, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, based at least in part on a number of TCI states of the one or more TCI states.

Aspect 16: The method of aspect 15, further comprising: determining, based at least in part on outputting the second control information that includes information indicative of one TCI state, that the first group of downlink control channel candidates are independent from the second group of downlink control channel candidates.

Aspect 17: The method of aspect 16, further comprising: outputting, to the second network node, a radio resource control message enabling the second network node to refrain from linking the first group of downlink control channel candidates and the second group of downlink control channel candidates based at least in part on the second control information that includes the information indicative of one TCI state, the determination based at least in part on outputting the radio resource control message.

Aspect 18: The method of any of aspects 16 through 17, further comprising: outputting, according to the one TCI state, a second downlink control information message in the second group of downlink control channel candidates in the second monitoring occasion associated with the second search space set, the first downlink control information message independent from the second downlink control information message.

Aspect 19: The method of any of aspects 15 through 18, further comprising: determining, based at least in part on outputting the second control information that includes the information indicative of two TCI states, that the first group of downlink control channel candidates are linked with the second group of downlink control channel candidates according to the first control information.

Aspect 20: The method of aspect 19, wherein outputting the first downlink control information message comprises: outputting a first repetition of the first downlink control information message according to a first TCI state of the two TCI states via a first coreset associated with the first search space set; and outputting a second repetition of the first downlink control information message according to a second TCI state of the two TCI states via a second coreset associated with the second search space set, the outputting the first repetition, the second repetition, or a combination thereof, based at last in part on a reference downlink control channel candidate of the first group of downlink control channel candidates.

Aspect 21: The method of any of aspects 15 through 20, further comprising: outputting, to the second network node, third control information that includes information indicative of a configuration of a first group of control resource sets comprising a first control resource set associated with the first search space set and a second group of control resource sets comprising a second control resource set associated with the second search space set; and determining whether the second network node is to link the first group of downlink control channel candidates and the second group of downlink control channel candidates based at least in part on the third control information, wherein outputting the first downlink control information message is based at least in part on the determination.

Aspect 22: The method of any of aspects 15 through 21, further comprising: determining whether the second network node is to link the first group of downlink control channel candidates and the second group of downlink control channel candidates based at least in part on whether a first control resource set associated with the first search space set is the same as a second control resource set associated with the second search space set.

Aspect 23: The method of any of aspects 15 through 22, further comprising: outputting, to the second network node, third control information that includes information indicative of a configuration of one or more groups of control resource sets; outputting, to the second network node, fourth control information that includes information indicative of a configuration of a first control resource set associated with the first search space set, a second control resource set associated with the second search space set, or both, wherein the first control resource set, the second control resource set, or both, are distinct from the one or more groups of control resource sets; and determining whether the second network node is to link the first group of downlink control channel candidates and the second group of downlink control channel candidates based at least in part on the fourth control information.

Aspect 24: An apparatus comprising a processor; and memory coupled with the processor, the processor configured to perform a method of any of aspects 1 through 14.

Aspect 25: An apparatus comprising at least one means for performing a method of any of aspects 1 through 14.

Aspect 26: A non-transitory computer-readable medium storing code the code comprising instructions executable by a processor to perform a method of any of aspects 1 through 14.

Aspect 27: An apparatus comprising a processor; memory coupled with the processor; and instructions stored in the memory and executable by the processor to cause the apparatus to perform a method of any of aspects 15 through 23.

Aspect 28: An apparatus comprising at least one means for performing a method of any of aspects 15 through 23.

Aspect 29: A non-transitory computer-readable medium storing code the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication by a first network node, comprising:

a processor; and memory coupled with the processor, the processor configured to:

receive, from a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets;

receive, from the second network node, second control information that includes information indicative of one or more transmission configuration indicator (TCI) states of one or more control resource sets associated with the two or more linked search space sets, wherein the one or more TCI states are used for at least a subset of communications between the first network node and the second network node after a period of time;

refrain from linking the first group of downlink control channel candidates and the second group of downlink control channel candidates based at least in part on the second control information that includes the information indicative of one TCI state; and receive, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, wherein a quantity of repetitions of the first downlink control information message received by the first network node is determined based at least in part on a quantity of TCI states of the one or more TCI states.

2. The apparatus of claim 1, wherein the processor is further configured to:
count a first downlink control channel candidate of the first group of downlink control channel candidates toward a blind decoding limit associated with a first slot; and
count a second downlink control channel candidate of the second group of downlink control channel candidates toward the blind decoding limit associated with the first slot based at least in part on the second control information that includes the information indicative of one TCI state, the first downlink control channel candidate and the second downlink control channel candidate being located in the first slot.

3. The apparatus of claim 1, wherein, to receive the first downlink control information message, the processor is further configured to:
receive, using the one TCI state, the first downlink control information message in one of the first group of downlink control channel candidates or the second group of downlink control channel candidates.

4. The apparatus of claim 1, wherein the processor is further configured to:
receive, from the second network node, a radio resource control message enabling the first network node to refrain from linking the first group of downlink control channel candidates and the second group of downlink control channel candidates based at least in part on the second control information that includes the information indicative of one TCI state, the processor further configured to refrain from linking based at least in part on receiving the radio resource control message.

5. The apparatus of claim 1, wherein the processor is further configured to:
receive, using the one TCI state, a second downlink control information message in the second group of downlink control channel candidates in the second monitoring occasion associated with the second search space set; and
decode the first downlink control information message independently from the second downlink control information message.

6. The apparatus of claim 1, wherein the one TCI state is associated with a first coreset associated with the first search space set and a second coreset associated with the second search space set.

7. The apparatus of claim 1, wherein the processor is further configured to:
receive, from the second network node, third control information that includes information indicative of a configuration of a first group of control resource sets comprising a first control resource set associated with the first search space set and a second group of control resource sets comprising a second control resource set associated with the second search space set; and
determine whether the first network node is to link the first group of downlink control channel candidates and the second group of downlink control channel candidates based at least in part on the third control information, wherein the processor is further configured to receive the second control information based at least in part on the determination.

8. The apparatus of claim 1, wherein the processor is further configured to:
determine whether the first network node is to link the first group of downlink control channel candidates and the second group of downlink control channel candidates based at least in part on whether a first control resource set associated with the first search space set is a same control resource set as a second control resource set associated with the second search space set.

9. The apparatus of claim 1, wherein the processor is further configured to:
receive, from the second network node, third control information that includes information indicative of a configuration of one or more groups of control resource sets;
receive, from the second network node, fourth control information that includes information indicative of a configuration of a first control resource set associated with the first search space set, a second control resource set associated with the second search space set, or both, wherein the first control resource set, the second control resource set, or both, are distinct from the one or more groups of control resource sets; and
determine whether the first network node is to link the first group of downlink control channel candidates and the second group of downlink control channel candidates based at least in part on the fourth control information.

10. The apparatus of claim 1, further comprising an antenna element configured to:
receive the first control information, the second control information, the first downlink control information message, or any combination thereof.

11. An apparatus for wireless communication at a first network node, comprising:
a processor; and
memory coupled with the processor, the processor configured to:
output, to a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets;
output, to the second network node, second control information that includes information indicative of one or more transmission configuration indicator (TCI) states of one or more control resource sets associated with the two or more linked search space sets, wherein the processor is further configured to use the one or more TCI states for at least a subset of communications between the first network node and the second network node after a period of time;
determine, based at least in part on outputting the second control information that includes information indicative of one TCI state, that the first group of downlink control channel candidates are independent from the second group of downlink control channel candidates; and
output, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, wherein a quantity of repetitions of the first downlink control information message output by the first network node is determined based at least in part on a quantity of TCI states of the one or more TCI states.

12. The apparatus of claim 11, wherein the processor is further configured to:
output, to the second network node, a radio resource control message enabling the second network node to refrain from linking the first group of downlink control channel candidates and the second group of downlink control channel candidates based at least in part on the second control information that includes the information indicative of one TCI state, the determination based at least in part on outputting the radio resource control message.

13. The apparatus of claim 11, wherein the processor is further configured to:
output, according to the one TCI state, a second downlink control information message in the second group of downlink control channel candidates in the second monitoring occasion associated with the second search space set, the first downlink control information message independent from the second downlink control information message.

14. The apparatus of claim 11, wherein the processor is further configured to:
output, to the second network node, third control information that includes information indicative of a configuration of a first group of control resource sets comprising a first control resource set associated with the first search space set and a second group of control resource sets comprising a second control resource set associated with the second search space set; and
determine whether the second network node is to link the first group of downlink control channel candidates and the second group of downlink control channel candidates based at least in part on the third control information, wherein the processor is further configured to output the first downlink control information message is based at least in part on the determination.

15. The apparatus of claim 11, wherein the processor is further configured to:
determine whether the second network node is to link the first group of downlink control channel candidates and the second group of downlink control channel candidates based at least in part on whether a first control resource set associated with the first search space set is the same as a second control resource set associated with the second search space set.

16. The apparatus of claim 11, wherein the processor is further configured to:
output, to the second network node, third control information that includes information indicative of a configuration of one or more groups of control resource sets;
output, to the second network node, fourth control information that includes information indicative of a configuration of a first control resource set associated with the first search space set, a second control resource set associated with the second search space set, or both, wherein the first control resource set, the second control resource set, or both, are distinct from the one or more groups of control resource sets; and
determine whether the second network node is to link the first group of downlink control channel candidates and the second group of downlink control channel candidates based at least in part on the fourth control information.

17. A method of wireless communications performed by a first network node, comprising:
receiving, from a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets;
receiving, from the second network node, second control information that includes information indicative of one or more transmission configuration indicator (TCI) states of one or more control resource sets associated with the two or more linked search space sets, wherein the one or more TCI states are used for at least a subset of communications between the first network node and the second network node after a period of time;
refraining from linking the first group of downlink control channel candidates and the second group of downlink control channel candidates based at least in part on the second control information that includes the information indicative of one TCI state; and
receiving, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, wherein a quantity of repetitions of the first downlink control information message received by the first network node is determined based at least in part on a quantity of TCI states of the one or more TCI states.

18. The method of claim 17, further comprising:
counting a first downlink control channel candidate of the first group of downlink control channel candidates toward a blind decoding limit associated with a first slot; and
counting a second downlink control channel candidate of the second group of downlink control channel candidates toward the blind decoding limit associated with the first slot based at least in part on the second control information that includes the information indicative of one TCI state, the first downlink control channel candidate and the second downlink control channel candidate being located in the first slot.

19. The method of claim 17, wherein receiving the first downlink control information message further comprises:
receiving, using the one TCI state, the first downlink control information message in one of the first group of downlink control channel candidates or the second group of downlink control channel candidates.

20. The method of claim 17, further comprising:
receiving, from the second network node, a radio resource control message enabling the first network node to refrain from linking the first group of downlink control channel candidates and the second group of downlink control channel candidates based at least in part on the second control information that includes the information indicative of one TCI state, wherein the first network node is configured to refrain from linking based at least in part on receiving the radio resource control message.

21. The method of claim 17, further comprising:
receiving, using the one TCI state, a second downlink control information message in the second group of downlink control channel candidates in the second monitoring occasion associated with the second search space set; and
decode the first downlink control information message independently from the second downlink control information message.

22. The method of claim 17, wherein the one TCI state is associated with a first coreset associated with the first search space set and a second coreset associated with the second search space set.

23. The method of claim 17, further comprising:
receiving, from the second network node, third control information that includes information indicative of a configuration of a first group of control resource sets comprising a first control resource set associated with the first search space set and a second group of control resource sets comprising a second control resource set associated with the second search space set; and
determining whether the first network node is to link the first group of downlink control channel candidates and the second group of downlink control channel candidates based at least in part on the third control information, wherein the first network node is further configured to receive the second control information based at least in part on the determination.

24. The method of claim 17, further comprising:
determining whether the first network node is to link the first group of downlink control channel candidates and the second group of downlink control channel candidates based at least in part on whether a first control resource set associated with the first search space set is a same control resource set as a second control resource set associated with the second search space set.

25. The method of claim 17, further comprising:
receiving, from the second network node, third control information that includes information indicative of a configuration of one or more groups of control resource sets;
receiving, from the second network node, fourth control information that includes information indicative of a configuration of a first control resource set associated with the first search space set, a second control resource set associated with the second search space set, or both, wherein the first control resource set, the second control resource set, or both, are distinct from the one or more groups of control resource sets; and
determining whether the first network node is to link the first group of downlink control channel candidates and the second group of downlink control channel candidates based at least in part on the fourth control information.

26. The method of claim 17, further comprising:
receiving the first control information, the second control information, the first downlink control information message, or any combination thereof.

27. A method of wireless communications performed by a first network node, comprising:
outputting, to a second network node, first control information that includes information indicative of two or more linked search space sets, wherein a first group of downlink control channel candidates in a first search space set of the two or more linked search space sets are linked with a second group of downlink control channel candidates in a second search space set of the two or more linked search space sets;
outputting, to the second network node, second control information that includes information indicative of one or more transmission configuration indicator (TCI) states of one or more control resource sets associated with the two or more linked search space sets, wherein the one or more TCI states are used for at least a subset of communications between the first network node and the second network node after a period of time;
determining, based at least in part on outputting the second control information that includes information indicative of one TCI state, that the first group of downlink control channel candidates are independent from the second group of downlink control channel candidates; and
outputting, using the one or more TCI states, a first downlink control information message via the first group of downlink control channel candidates in a first monitoring occasion associated with the first search space set, the second group of downlink control channel candidates in a second monitoring occasion associated with the second search space set, or a combination thereof, wherein a quantity of repetitions of the first downlink control information message output by the first network node is determined based at least in part on a quantity of TCI states of the one or more TCI states.

28. The method of claim 27, further comprising:
outputting, to the second network node, a radio resource control message enabling the second network node to refrain from linking the first group of downlink control channel candidates and the second group of downlink control channel candidates based at least in part on the second control information that includes the information indicative of one TCI state, the determination based at least in part on outputting the radio resource control message.

29. The method of claim 27, further comprising:
outputting, according to the one TCI state, a second downlink control information message in the second group of downlink control channel candidates in the second monitoring occasion associated with the second search space set, the first downlink control information message independent from the second downlink control information message.

30. The method of claim 27, further comprising:
outputting, to the second network node, third control information that includes information indicative of a configuration of a first group of control resource sets comprising a first control resource set associated with the first search space set and a second group of control resource sets comprising a second control resource set associated with the second search space set; and
determining whether the second network node is to link the first group of downlink control channel candidates and the second group of downlink control channel candidates based at least in part on the third control information, wherein the first network node is further configured to output the first downlink control information message is based at least in part on the determination.

* * * * *